(12) United States Patent
Choudhary et al.

(10) Patent No.: US 11,257,300 B2
(45) Date of Patent: Feb. 22, 2022

(54) SCALABLE THREE-DIMENSIONAL OBJECT RECOGNITION IN A CROSS REALITY SYSTEM

(71) Applicant: Magic Leap, Inc., Plantation, FL (US)

(72) Inventors: Siddharth Choudhary, San Jose, CA (US); Divya Ramnath, Sunnyvale, CA (US); Shiyu Dong, Santa Clara, CA (US); Siddharth Mahendran, Mountain View, CA (US); Arumugam Kalai Kannan, Sunnyvale, CA (US); Prateek Singhal, Mountain View, CA (US); Khushi Gupta, Mountain View, CA (US); Nitesh Sekhar, Mountain View, CA (US); Manushree Gangwar, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/899,878

(22) Filed: Jun. 12, 2020

(65) Prior Publication Data
US 2020/0394848 A1    Dec. 17, 2020

Related U.S. Application Data

(60) Provisional application No. 63/024,291, filed on May 13, 2020, provisional application No. 63/006,408, (Continued)

(51) Int. Cl.
*G06T 7/50*      (2017.01)
*G06K 9/00*      (2006.01)
*G06T 19/20*     (2011.01)

(52) U.S. Cl.
CPC .......... *G06T 19/20* (2013.01); *G06K 9/00624* (2013.01); *G06T 7/50* (2017.01); (Continued)

(58) Field of Classification Search
None
See application file for complete search history.

(56) References Cited

U.S. PATENT DOCUMENTS 9,158,972 B2   10/2015   Datta et al.
9,251,598 B2    2/2016   Wells et al.
(Continued)

OTHER PUBLICATIONS

Fischler et al., "Random Sample Consensus: A Paradigm for Model Fitting with Applications to Image Analysis and Automated Cartography," Communications of the ACM, Jun. 1981, 24(6):381-395.
(Continued)

*Primary Examiner* — Yanna Wu
(74) *Attorney, Agent, or Firm* — Fish & Richardson P.C.

(57) ABSTRACT

Methods, systems, and apparatus, including computer programs encoded on a computer storage medium, for scalable three-dimensional (3-D) object recognition in a cross reality system. One of the methods includes maintaining object data specifying objects that have been recognized in a scene. A stream of input images of the scene is received, including a stream of color images and a stream of depth images. A color image is provided as input to an object recognition system. A recognition output that identifies a respective object mask for each object in the color image is received. A synchronization system determines a corresponding depth image for the color image. A 3-D bounding box generation system determines a respective 3-D bounding box for each object that has been recognized in the color image. Data specifying one or more 3-D bounding boxes is received as output from the 3-D bounding box generation system.

20 Claims, 8 Drawing Sheets

Related U.S. Application Data filed on Apr. 7, 2020, provisional application No. 62/968,023, filed on Jan. 30, 2020, provisional application No. 62/861,784, filed on Jun. 14, 2019.

(52) U.S. Cl.
CPC ............... *G06T 2207/10024* (2013.01); *G06T 2207/10028* (2013.01); *G06T 2207/20084* (2013.01)

(56) References Cited

U.S. PATENT DOCUMENTS

| 9,542,626 | B2 | 1/2017 | Martinson et al. | |
|---|---|---|---|---|
| 2010/0201871 | A1 | 8/2010 | Zhang et al. | |
| 2016/0196659 | A1* | 7/2016 | Vrcelj | G06T 7/12 382/154 |
| 2017/0011281 | A1 | 1/2017 | Dijkman et al. | |
| 2017/0228940 | A1* | 8/2017 | Kutliroff | G06T 7/12 |
| 2017/0243352 | A1* | 8/2017 | Kutliroff | G06T 19/006 |

OTHER PUBLICATIONS

He, et al. "Mask R-CNN" Proceedings of the IEEE International Conference on Computer Vision (ICCV), Oct. 22-29, 2017, Venice, Italy, 2980-2988.

Liu et al., "SSD: Single Shot MultiBox Detector," arXiv, Dec. 29, 2016, arXiv:1512.02325v5, 17 pages.

Munkres, "Algorithms for the Assignment and Transportation Problems." J. Soc. Indust. Appl. Mathematics, Mar. 1957, 5(1):32-38.

Neubeck et al., "Efficient Non-Maximum Suppression," Proceedings of the 18th International Conference on Pattern Recognition (ICPR '06), Aug. 20-24, 2006, Hong Kong, 3:850-855.

PCT International Search Report and Written Opinion in International Appln. No PCT/US2020/037573, dated Aug. 12, 2020, 10 pages.

Redmon et al., "You Only Look Once: Unified, Real-Time Object Detection," Proceedings of the IEEE Conference on Computer Vision and Pattern Recognition (CVPR), Jun. 27-30, 2016, Las Vegas, Nevada, UA, 779-788.

Ren et al., "Faster R-CNN: Towards Real-Time Object Detection with Region Proposal Networks," Proceedings of the 28th International Conference on Neural Information Processing Systems (NIPS '15), Dec. 7-12, 2015, Montreal, Canada, 91-99.

Rubino et al., "3D Object Localisation from Multi-view Image Detections," IEEE Transactions on Pattern Analysis and Machine Intelligence, May 4, 2017, 40(6):1281-1294.

Samet et al., "Efficient Component Labeling of Images of Arbitrary Dimension Represented by Linear Bintrees," IEEE Transactions on Pattern Analysis and Machine Intelligence, Jul. 1988, 10(4):579-586.

* cited by examiner

SCALABLE THREE-DIMENSIONAL OBJECT RECOGNITION IN A CROSS REALITY SYSTEM

CROSS-REFERENCE TO RELATED APPLICATIONS

This patent application claims priority to and the benefit of U.S. Provisional Patent Application No. 62/861,784, filed on Jun. 14, 2019 and entitled "OBJECT RECOGNITION AND SCENE UNDERSTANDING," which is hereby incorporated herein by reference in its entirety. This patent application also claims priority to and the benefit of U.S. Provisional Patent Application No. 62/968,023, filed on Jan. 30, 2020 and entitled "A CROSS REALITY SYSTEM," which is hereby incorporated herein by reference in its entirety. This patent application also claims priority to and the benefit of U.S. Provisional Patent Application No. 63/006,408, filed on Apr. 7, 2020 and entitled "SCALABLE THREE-DIMENSIONAL OBJECT RECOGNITION IN A CROSS REALITY SYSTEM," which is hereby incorporated herein by reference in its entirety. This patent application also claims priority to and the benefit of U.S. Provisional Patent Application No. 63/024,291, filed on May 13, 2020 and entitled "SCALABLE THREE-DIMENSIONAL OBJECT RECOGNITION IN A CROSS REALITY SYSTEM," which is hereby incorporated herein by reference in its entirety.

TECHNICAL FIELD

This application relates generally to a cross reality system.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users' sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

To realistically render virtual content, an XR system may build a representation of the physical world around a user of the system. This representation, for example, may be constructed by processing images acquired with sensors on a wearable device that forms a part of the XR system. In such a system, a user might perform an initialization routine by looking around a room or other physical environment in which the user intends to use the XR system until the system acquires sufficient information to construct a representation of that environment. As the system operates and the user moves around the environment or to other environments, the sensors on the wearable devices might acquire additional information to expand or update the representation of the physical world.

The system may recognize objects in the physical world using a two-dimensional (2-D) object recognition system. For example, the system may provide an image acquired with a sensor on the wearable device as an input to a 2-D bounding box generation system. The system may receive a respective 2-D bounding box for each of the objects that have been recognized in the image. The XR system can build a representation of the physical world using the 2-D bounding boxes for the objects that have been recognized. As the user moves around the environment or to other environments, the XR system can expand or update the representation of the physical world using the 2-D bounding boxes for the objects that have been recognized in additional images acquired by the sensors.

BRIEF SUMMARY

Aspects of the present application relate to methods and apparatus for scalable three-dimensional (3-D) object recognition in an X reality (cross reality or XR) system. Techniques as described herein may be used together, separately, or in any suitable combination.

In general, one innovative aspect of the subject matter described in this specification can be embodied in methods that include the actions of maintaining object data specifying objects that have been recognized in a scene in an environment; receiving a stream of input images of the scene, wherein the stream of input images comprises a stream of color images and a stream of depth images; for each of a plurality of color images in the stream of color images: providing the color image as input to an object recognition system; receiving, as output from the object recognition system, a recognition output that identifies a respective object mask in the color image for each of one or more objects that have been recognized in the color image; providing the color image and a plurality of depth images in the stream of depth images as input to a synchronization system that determines a corresponding depth image for the color image based on a timestamp of the corresponding depth image and a timestamp of the color image; providing the object data, the recognition output identifying the object masks, and the corresponding depth image as input to a three-dimensional (3-D) bounding box generation system that determines, from the object data, the object masks, and the corresponding depth image, a respective 3-D bounding box for each of one or more of the objects that have been recognized in the color image; and receiving, as output from the 3-D bounding box generation system, data specifying one or more 3-D bounding boxes for one or more of the objects recognized in the color image; and providing, as output, data specifying the one or more 3-D bounding boxes. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

The foregoing and other embodiments can each optionally include one or more of the following features, alone or in combination. In particular, one embodiment includes all the following features in combination. The 3-D bounding box generation system comprises a multi-view fusion system that generates an initial set of 3-D object masks. The object recognition system, the synchronization system, the multi-view fusion system operate in a stateless manner and independently from one another. The multi-view fusion system comprises an association system that identifies, from the maintained object data, matched object data specifying a corresponding object with the respective object mask of each recognized object in the color image; and a fusion system that generates, for each recognized object in the color image, an initial 3-D object mask by combining the object mask in the color image with the matched object data. The 3-D bounding box generation system further comprises an object refinement system that refines the initial set of 3-D object masks to generate an initial set of 3-D bounding boxes. The 3-D bounding box generation system further comprises a bounding box refinement system that refines the initial set of 3-D bounding boxes to generate the one or more 3-D bounding boxes. The object recognition system comprises a trained deep neural network (DNN) model that takes the color image as input and generates a respective two-dimensional (2-D) object mask for each of the one or more objects that have been recognized in the color image. Determining, by the synchronization system, a corresponding depth image for the color image based on timestamps of the corresponding depth images and timestamp of the color image comprises: identifies a candidate depth image which has a closest timestamp to the timestamp of the color image; determining that a time difference between the candidate depth image and the color image is less than a threshold; and in response, determining the candidate depth image as the corresponding depth image for the color image. The 3-D bounding box generation system determines, from the object masks and the corresponding depth image, a respective 3-D object mask for each of the one or more of the objects that have been recognized in the color image, and wherein the method further comprises: receiving, as output from the 3-D bounding box generation system, data specifying one or more 3-D object masks for the one or more of the objects recognized in the color image; and providing, as output, data specifying the one or more 3-D object masks.

In general, another innovative aspect of the subject matter described in this specification can be embodied in methods that include the actions of maintaining object data specifying objects that have been recognized in a scene in an environment; receiving a stream of input images of the scene; for each of a plurality of input images in the stream of input images: providing the input image as input to an object recognition system; receiving, as output from the object recognition system, a recognition output that identifies a respective bounding box in the input image for each of one or more objects that have been recognized in the input image; providing data identifying the bounding boxes as input to a three-dimensional (3-D) bounding box generation system that determines, from the object data and the bounding boxes, a respective 3-D bounding box for each of one or more of the objects that have been recognized in the input image; and receiving, as output from the 3-D bounding box generation system, data specifying one or more 3-D bounding boxes for one or more of the objects recognized in the input image; and providing, as output, data specifying the one or more 3-D bounding boxes. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

The foregoing and other embodiments can each optionally include one or more of the following features, alone or in combination. In particular, one embodiment includes all the following features in combination. The 3-D bounding box generation system comprises: a multi-view fusion system that generates an initial set of 3-D bounding boxes; and a bounding box refinement system that refines the initial set of 3-D bounding boxes to generate the one or more 3-D bounding boxes. The object recognition system, the multi-view fusion system, and the bounding box refinement system operate in a stateless manner and independently from one another. The maintained object data comprises an ellipsoid that is generated from a plurality of two-dimensional (2-D) bounding boxes of each object that have been recognized in the scene, and the multi-view fusion system generates the initial set of 3-D bounding boxes by performing at least the following steps: for each 2-D bounding box identified in the input image, determining whether the 2-D bounding box identified in the input image is associated with one or more 2-D bounding boxes of an object that has been recognized in the maintained object data; in response to determining that the 2-D bounding box identified in the input image is associated with one or more 2-D bounding boxes of an object that has been recognized, updating the maintained object data by calculating an updated ellipsoid of the object using the 2-D bounding box identified in the input image; in response to determining that the 2-D bounding box identified in the input image is not associated with any objects that have been recognized, creating a new object by generating an ellipsoid from at least the 2-D bounding box identified in the input image; and generating the initial set of 3-D bounding boxes using the ellipsoids of the objects that have been recognized in the input image. The object recognition system comprises a trained deep neural network (DNN) model that takes the input image and generates a respective two-dimensional (2-D) object bounding box for each of the one or more objects that have been recognized in the input image. The stream of input images of the scene are captured from two or more user devices.

The specification describes techniques for generating 3-D bounding boxes of objects from color images and depth images captured by user devices. By using these techniques, the 3-D object recognition system can perform 3-D object recognition using a stream of images captured by multiple user devices that are connected to a cloud. The system can jointly recognize multiple objects in a scene shared among multiple user devices and can generate 3-D bounding boxes of the objects from color images and depth images captured by the user devices. The 3-D object recognition is scalable in the number of user devices and the number of objects in the scene. The 3-D object recognition system includes multiple independent subsystems that can be implemented in multiple stateless modules. These stateless modules can be scaled up or scaled down as needed. This enables the 3-D object recognition system to recognize objects in a large environment, e.g., at a building or city scale, with hundreds or thousands of XR devices, and with hundreds or thousands of 3-D objects.

Based on a passable world model generated or updated from the 3-D bounding boxes, the XR system can enable multiple applications and can improve immersive experiences in the applications. Users of the XR system or application developers can place XR contents or applications in the physical world with one or more objects that have been recognized in the scene of the environment. For example, a game application can set a virtual object (e.g., a cup of coffee) on top of a real world coffee table that has been recognized in the passable world model.

By making use of the described techniques, an XR application can have more immersive experiences. For example, a virtual assistant of an interactive game application can sit on one of the chairs that have been recognized in the passable world model in order to provide a more immersive experience. Spatial audio in an AR application can use the locations of the detected 3-D objects to properly reflect sounds depending on the category of each object.

In some implementations, the XR system can build a spatial knowledge graph of objects based on the passable world model that includes locations of the detected 3-D objects. In some implementations, the XR system can perform more robustly by making use of the location information of the detected 3-D objects. For example, tracking, localization or meshing computations can be more robust to long term dynamic changes, such as moving objects, by making use of the 3-D object detections.

The specification describes techniques for generating 3-D bounding boxes of objects from color images, without using depth images. By using these techniques, the 3-D object recognition system can perform 3-D object recognition using a stream of images captured by multiple user devices that are connected to a cloud. The system can jointly recognize multiple objects in a scene shared among multiple user devices and can generate 3-D bounding boxes of the objects from color images captured by the user devices. By only using the color images and without using depth images, the system can generate accurate 3-D bounding boxes of objects even with poor depth information, e.g., black objects or reflective objects for which depth information tends to be missing, poor, or unreliable. The 3-D object recognition is scalable in the number of user devices and the number of objects in the scene. The 3-D object recognition system includes multiple independent subsystems that can be implemented in multiple stateless modules. These stateless modules can be scaled up or scaled down as needed. This enables the 3-D object recognition system to recognize objects in a large environment, e.g., at a building or city scale, with hundreds or thousands of XR devices, and with hundreds or thousands of 3-D objects.

Based on a passable world model generated or updated from the 3-D bounding boxes, the XR system can enable multiple applications and can improve immersive experiences in the applications. Users of the XR system or application developers can place XR contents or applications in the physical world with one or more objects that have been recognized in the scene of the environment. For example, a game application can set a virtual object (e.g., a cup of coffee) on top of a real world coffee table that has been recognized in the passable world model.

By making use of the described techniques, an XR application can have more immersive experiences. For example, a virtual assistant of an interactive game application can sit on one of the chairs that have been recognized in the passable world model in order to provide a more immersive experience. Spatial audio in an AR application can use the locations of the detected 3-D objects to properly reflect sounds depending on the category of each object.

In some implementations, the XR system can build a spatial knowledge graph of objects based on the passable world model that includes locations of the detected 3-D objects. In some implementations, the XR system can perform more robustly by making use of the location information of the detected 3-D objects. For example, tracking, localization or meshing computations can be more robust to long term dynamic changes, such as moving objects, by making use of the 3-D object detections.

The foregoing summary is provided by way of illustration and is not intended to be limiting.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Described herein are methods and apparatus for scalable three-dimensional (3-D) object recognition in an X reality (cross reality or XR) system. To provide realistic XR experiences to multiple users, an XR system must know the users' physical surroundings in order to correctly correlate locations of virtual objects in relation to real objects. An XR system may build an environment map of a scene, which may be created from image and/or depth information collected with sensors that are part of XR devices worn by users of the XR system. The environment map of a scene can include data specifying the real objects in the scene which can be obtained through the scalable 3-D object recognition.

Figure 1:
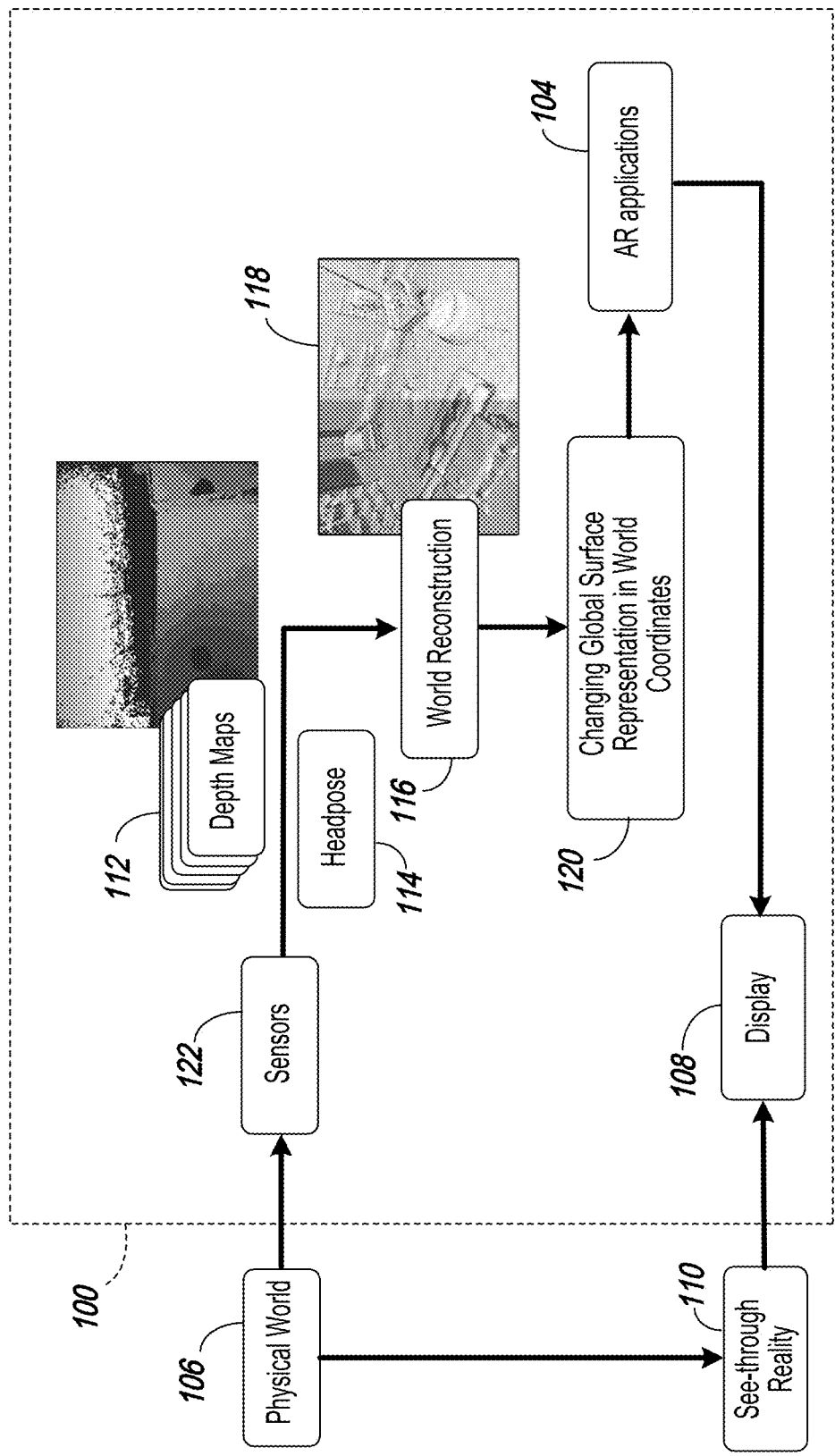
FIG. 1 is a schematic diagram illustrating data flow in an AR system configured to provide an experience to the user of AR content interacting with a physical world.

FIG. 1 depicts an AR system 100 configured to provide an experience of AR contents interacting with a physical world 106, according to some embodiments. The AR system 100 may include a display 108. In the illustrated embodiment, the display 108 may be worn by the user as part of a headset such that a user may wear the display over their eyes like a pair of goggles or glasses. At least a portion of the display may be transparent such that a user may observe a see-through reality 110. The see-through reality 110 may correspond to portions of the physical world 106 that are within a present viewpoint (e.g. field of view) of the AR system 100, which may correspond to the viewpoint of the user in the case that the user is wearing a headset incorporating both the display and sensors of the AR system to acquire information about the physical world.

AR contents may also be presented on the display 108, overlaid on the see-through reality 110. To provide accurate interactions between AR contents and the see-through reality 110 on the display 108, the AR system 100 may include sensors 122 configured to capture information about the physical world 106.

The sensors 122 may include one or more depth sensors that output depth maps 112. In some embodiments, one or more depth sensors may output depth data that may be converted into depth maps by a different system or by one or more different components of the XR system. Each depth map 112 may have multiple pixels, each of which may represent a distance to a surface in the physical world 106 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire monocular or stereoscopic information that may be processed to represent the physical world in other ways. For example, the images may be processed in world reconstruction component 116 to create a mesh, representing all or portions of objects in the physical world. Metadata about such objects, including for example, color and surface texture, may similarly be acquired with the sensors and stored as part of the world reconstruction.

The system may also acquire information about the head pose (or "pose") of the user with respect to the physical world. In some embodiments, a head pose tracking component of the system may be used to compute head poses in real time. The head pose tracking component may represent a head pose of a user in a coordinate frame with six degrees of freedom including, for example, translation in three perpendicular axes (e.g., forward/backward, up/down, left/right) and rotation about the three perpendicular axes (e.g., pitch, yaw, and roll). In some embodiments, sensors 122 may include inertial measurement units that may be used to compute and/or determine a head pose 114. A head pose 114 for a camera image may indicate a present viewpoint of a sensor capturing the camera image with six degrees of freedom, for example, but the head pose 114 may be used for other purposes, such as to relate image information to a particular portion of the physical world or to relate the position of the display worn on the user's head to the physical world.

In some embodiments, the AR device may construct a map from the feature points recognized in successive images in a series of image frames captured as a user moves throughout the physical world with the AR device. Though each image frame may be taken from a different pose as the user moves, the system may adjust the orientation of the features of each successive image frame to match the orientation of the initial image frame by matching features of the successive image frames to previously captured image frames. Translations of the successive image frames so that points representing the same features will match corresponding feature points from previously collected image frames, can be used to align each successive image frame to match the orientation of previously processed image frames. The frames in the resulting map may have a common orientation established when the first image frame was added to the map. This map, with sets of feature points in a common frame of reference, may be used to determine the user's pose within the physical world by matching features from current image frames to the map. In some embodiments, this map may be called a tracking map.

In addition to enabling tracking of the user's pose within the environment, this map may enable other components of the system, such as world reconstruction component 116, to determine the location of physical objects with respect to the user. The world reconstruction component 116 may receive the depth maps 112 and head poses 114, and any other data from the sensors, and integrate that data into a reconstruction 118. The reconstruction 118 may be more complete and less noisy than the sensor data. The world reconstruction component 116 may update the reconstruction 118 using spatial and temporal averaging of the sensor data from multiple viewpoints over time.

The reconstruction 118 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 118, portions of the physical world are presented as a global surface; on the right side of the reconstruction 118, portions of the physical world are presented as meshes.

In some embodiments, the map maintained by head pose component 114 may be sparse relative to other maps that might be maintained of the physical world. Rather than providing information about locations, and possibly other characteristics, of surfaces, the sparse map may indicate locations of interest points and/or structures, such as corners or edges. In some embodiments, the map may include image frames as captured by the sensors 122. These frames may be reduced to features, which may represent the interest points and/or structures. In conjunction with each frame, information about a pose of a user from which the frame was acquired may also be stored as part of the map. In some embodiments, every image acquired by the sensor may or may not be stored. In some embodiments, the system may process images as they are collected by sensors and select subsets of the image frames for further computation. The selection may be based on one or more criteria that limits the addition of information yet ensures that the map contains useful information. The system may add a new image frame to the map, for example, based on overlap with a prior image frame already added to the map or based on the image frame containing a sufficient number of features determined as likely to represent stationary objects. In some embodiments, the selected image frames, or groups of features from selected image frames may serve as key frames for the map, which are used to provide spatial information.

The AR system 100 may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction of the physical world, which may serve as an abstract layer for the map and provide spatial information. The reconstruction may be more complete and less noisy than the original sensor data by using spatial and temporal averaging (i.e. averaging data from multiple viewpoints over time), or any other suitable method.

In the illustrated embodiment in FIG. 1, a map (e.g. a tracking map) represents the portion of the physical world in which a user of a single, wearable device is present. In that scenario, head pose associated with frames in the map may be represented as a local head pose, indicating orientation relative to an initial orientation for a single device at the start of a session. For example, the head pose may be tracked relative to an initial head pose when the device was turned on or otherwise operated to scan an environment to build a representation of that environment.

In combination with content characterizing that portion of the physical world, the map may include metadata. The metadata, for example, may indicate time of capture of the sensor information used to form the map. Metadata alternatively or additionally may indicate location of the sensors at the time of capture of information used to form the map. Location may be expressed directly, such as with information from a GPS chip, or indirectly, such as with a Wi-Fi signature indicating strength of signals received from one or more wireless access points while the sensor data was being collected and/or with the BSSIDs of wireless access points to which the user device connected while the sensor data was collected.

The reconstruction 118 may be used for AR functions, such as producing a surface representation of the physical world for occlusion processing or physics-based processing. This surface representation may change as the user moves or objects in the physical world change. Aspects of the reconstruction 118 may be used, for example, by a component 120 that produces a changing global surface representation in world coordinates, which may be used by other components.

The AR content may be generated based on this information, such as by AR applications 104. An AR application 104 may be a game program, for example, that performs one or more functions based on information about the physical world, such as visual occlusion, physics-based interactions, and environment reasoning. It may perform these functions by querying data in different formats from the reconstruction 118 produced by the world reconstruction component 116. In some embodiments, component 120 may be configured to output updates when a representation in a region of interest of the physical world changes. That region of interest, for example, may be set to approximate to a portion of the physical world in the vicinity of the user of the system, such as the portion within the view field of the user, or is projected (predicted/determined) to come within the view field of the user.

The AR applications 104 may use this information to generate and update the AR contents. The virtual portion of the AR contents may be presented on the display 108 in combination with the see-through reality 110, creating a realistic user experience.

Figure 2:
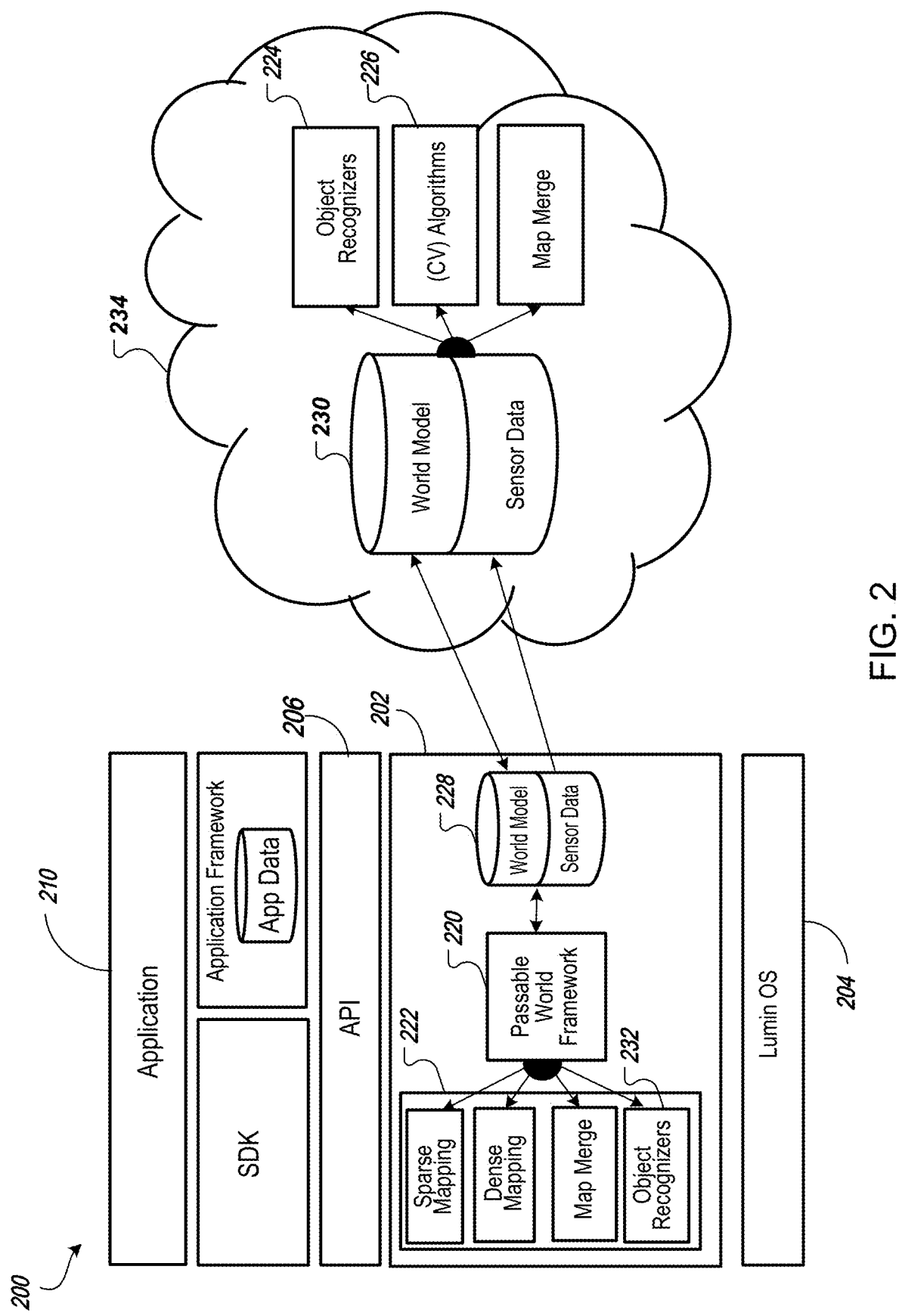
FIG. 2 is a schematic diagram illustrating components of an AR system that maintain a model of a passable world.

FIG. 2 is a schematic diagram illustrating components of an AR system 200 that maintain a passable world model. The passable world model is a digital representation of the real objects in the physical world. The passable world model can be stored and updated with changes to the real objects in the physical world. The passable world model can be stored in storage systems in combination with images, features, directional audio inputs, or other desired data. The passable world model can be used to generate the reconstruction 118 by the world reconstruction component 116 in FIG. 1.

In some implementations, a passable world model may be represented in a way that may be readily shared among users and among the distributed components, including applications. Information about the physical world, for example, may be represented as persistent coordinate frames (PCFs). A PCF may be defined based on one or more points that represent features recognized in the physical world. The features may be selected such that they are likely to be the same from user session to user session of the XR system. PCFs may be defined sparsely based on one or more points in the space (e.g., corners, edges), providing less than all of the available information about the physical world, such that they may be efficiently processed and transferred. A PCF may comprise six degrees of freedom with translations and rotations relative to a map coordinate system.

The AR system 200 may include a passable world component 202, an operating system (OS) 204, API's 206, SDK 208, and Application 210. The OS 204 may include a Linux-based kernel with custom drivers compatible with an AR device, e.g., a Lumin OS. The API's 206 may include application programming interfaces that grant AR applications (e.g., Applications 210) access to the spatial computing features of an AR device. The SDK 208 may include a software development kit that allows the creation of AR applications.

The passable world component 202 can create and maintain a passable world model. In this example sensor data is collected on a local device. Processing of that sensor data may be performed in part locally on the XR device and partially in the cloud. In some embodiments, processing of that sensor data may be performed only on the XR device, or only in the cloud. The passable world model may include environment maps created based, at least in part, on data captured by AR devices worn by multiple users.

The passable world component 202 includes a passable world framework (FW) 220, storage system 228, and a plurality of spatial computation components 222.

The passable world framework 220 can include computer-implemented algorithms programmed to create and maintain the model of the passable world. The passable world framework 220 stores the passable world model in a storage system 228. For example, the passable world framework can store a current passable world model and sensor data in the storage system 228. The passable world framework 220 creates and updates the passable world model by calling the spatial computation components 222. For example, the passable world framework can obtain 3-D bounding boxes of the objects in a scene by triggering the object recognizers 232 to perform 3-D object recognition.

The spatial computation components 222 include a plurality of components that can perform computation in the 3-D space of a scene. For example, the spatial computation components 222 can include an object recognition system (also called "object recognizers") 232, sparse mapping system, dense mapping system and map merge systems, etc. The spatial computation components 222 can generate outputs that can be used to create or update the passable world model. For example, the object recognition system can generate output data that specifies one or more 3-D bounding boxes of one or more objects that have been recognized in a stream of images captured by sensors of an AR device.

The storage system 228 can store the passable world model and sensor data acquired from multiple AR devices in one or more databases. The storage system can provide sensor data and an existing passable world model, e.g., objects that have been recognized in the scene, to the algorithms in the passable world FW 220. After computing an updated passable world model based on newly acquired sensor data, the storage system 228 can receive the updated passable world model from the passable world FW 220 and store the updated passable world model in the databases.

In some implementations, part or all components of the passable world component 202 can be implemented in a plurality of computers or computer systems in a cloud computing environment 234. The cloud computing environment 234 has distributed scalable computation resources that can be physically located at a location different from the location of the AR system 200. The plurality of computers or computer systems in the cloud computing environment 234 can provide a flexible amount of storage and computation capabilities. Using the cloud computing environment, the AR system 200 can provide scalable AR Applications 210 that involves multiple user devices, and/or an environment that includes a large amount of physical objects.

In some implementations, a cloud storage system 230 can store the world model and the sensor data. The cloud storage system 230 can have scalable storage capacity and can adapt to various amounts of storage needs. For example, the cloud storage system 230 can receive recently captured sensor data from a local storage system 228. As more and more sensor data is captured by sensors of an AR device, the cloud storage system 230 that has large storage capacity can accommodate the recently captured sensor data. The cloud storage system 230 and the local storage system 228 can store the same world model. In some implementations, a complete world model of an environment can be stored on the cloud storage system 230, while a part of the passable world model that is pertinent to the current AR Application 210 can be stored on the local storage system 228.

In some implementations, some of the spatial computation components 222 can be executed in the cloud computing environment 234. For example, object recognizers 224, computer vision algorithms 226, map merge and many other kinds of spatial computation components can be implemented and executed in the cloud. The cloud computing environment 234 can provide more scalable and more powerful computers and computer systems to support the computation needs of these spatial computation components. For example, an object recognizer may include a deep convolutional neural network (DNN) model that requires heavy computation using graphical computation units (GPUs) or other hardware accelerators and a large amount of runtime memory to store the DNN model. The cloud computing environment can support this kind of requirement of the object recognizer.

In some implementations, the spatial computation components, e.g., object recognizers, can perform computation in the cloud while using the sensor data and existing world model that are stored in the cloud storage system 230. In some implementations, the spatial computation and the cloud storage can exist in the same cloud computer system in order to enable efficient computation in the cloud. The cloud computation results, e.g., object recognition results, can be further processed and then stored as an updated passable world model in the cloud storage system 230.

In some implementations, a spatial computation component may include a plurality of subsystems that require a variable amount of computation resources. For example, an object recognizer 224 can include multiple subsystems that each require different amounts of computational resources, such as memory, processor cycles, e.g., CPU or GPU, cycles, etc., depending on the current load on the system.

These subsystems can be implemented as stateless modules that can be scaled up and down as needed. A stateless module is a stateless software application that does not depend on one or more preceding states in a sequence of computations. Each stateless module decouples the computation from the state and manages the state through an input and an output of each stateless module. In other words, a stateless module can perform computation on each input without requiring the module to maintain any state from a previous input. These modules can perform their respective computation workloads without storing sensor data or other intermediate data, while the passable world model is stored in the cloud storage system 230. The stateless modules can be scaled up or scaled down independently from one another.

The object recognition system (also called "object recognizers") 224 can generate 3-D object recognition outputs for multiple 3-D objects in a scene of the environment using an object recognition algorithm. The object recognition system 224 can take as input sensor data acquired from sensors of one or more AR devices. The sensor data acquired from each AR device can provide a stream of images (e.g. color images) that characterize a scene from a plurality of camera poses. The object recognition algorithm can be divided into multiple independent stateless modules that can run in the cloud computing environment 234. The multiple stateless modules can be scaled up or scaled down depending on the current computational need of each module. More details of the scalable 3-D object recognition system are described in connection with FIGS. 3 and 4.

Figure 3:
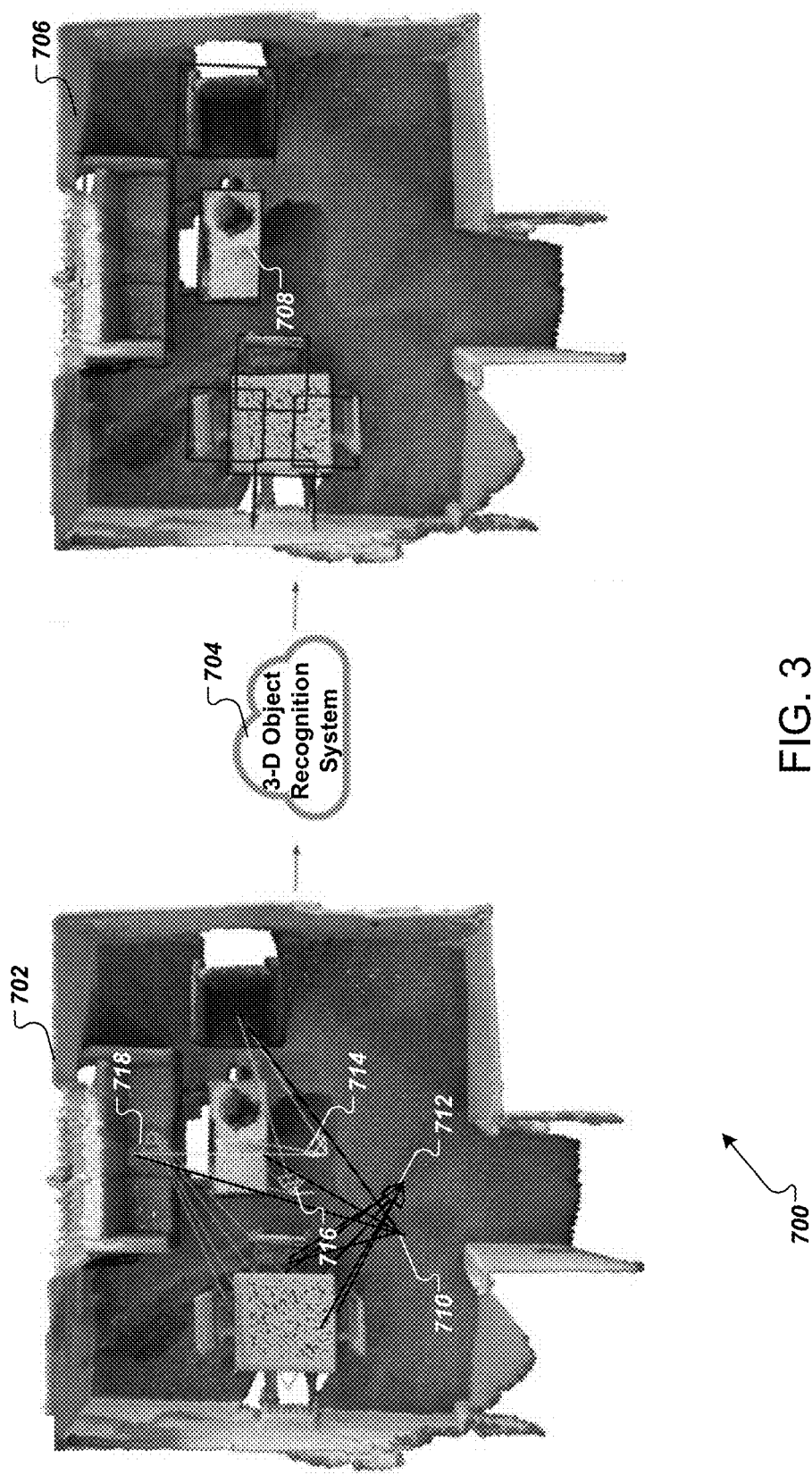
FIG. 3 shows an example 3-D object recognition system that generates 3-D bounding boxes for objects in a scene.

FIG. 3 shows an example 3-D object recognition system 700 that generates 3-D bounding boxes for objects in a scene. The system 700 can be one example of the object recognizers 224 that run in the cloud environment. The top view of a scene 702 is shown on the left. The scene 702 depicts a scene of a living room that has several 3-D objects, including a dining table, four dining chairs surrounding the dining table, a long couch, a single sofa and a coffee table that is surrounded by the long couch and the single sofa. A stream of input images of the scene 702 is captured using one or more cameras.

In some implementations, multiple cameras (e.g. RGB-D) from multiple AR devices can generate color images and depth images of the scene from various camera poses. For example, five RGB-D cameras can obtain information of the scene. As each camera moves in the living room, each camera can capture a stream of images at a series of timestamps. At a particular timestamp, the camera poses 710, 712, 714, 716, and 718 of the five cameras are shown in FIG. 3.

Each camera pose is illustrated with a plurality of straight lines, and each straight line connects each object center visible from that pose to the camera. For example, the camera pose 710 includes a first line that connects to a dining chair, a second line that connects to the long couch, a third line that connects to the coffee table, and a fourth line that connects to the single sofa. This means that the dining chair, the long couch, the coffee table and the single sofa are visible from this camera pose. The dining table and the other three dining chairs are not visible from this camera pose.

In some implementations, an RGB-D camera can generate a stream of color images and a stream of depth images of the scene as the user who wears the AR device travels in the scene. For example, as a user wearing the AR device enters the living room, the AR device can capture a plurality of images corresponding to the camera pose 710 and 712. As the user walks towards the coffee table, the AR device can capture a plurality of images corresponding to the camera poses 714 and 716. Finally, when the user sits down on the long couch, the AR device can capture a plurality of images corresponding to the camera pose 718. The images captured from camera poses 710, 712, 714, 716 and 718 can be a stream of images of the scene 702.

The stream of images of the scene 702 captured by a plurality of camera poses can provide abundant 3-D information of the 3-D objects in the scene. The stream of images of the scene can be used to generate object recognition outputs even though some of the objects are occluded or not visible at some of the camera poses.

In some embodiments, the stream of images of the scene can include a stream of color images and a stream of depth images.

Color images are frames of two-dimensional (2-D) images or videos captured by a camera. Each 2-D image can be an RGB image depicting colors of one or more objects and colors of their surrounding environment in the physical world. The color images can be captured at a series of corresponding timestamps. The timestamp information of a color image records the date and time the color image is being captured.

Depth images capture depth information of objects in the scene. The intensity values in the depth images represent the distance of the surfaces of the objects from a camera pose. That is, the intensity value for each pixel in the image represents the distance of the object in the scene that is depicted at that pixel from the camera that captured the depth image. The timestamp information of a depth image records the data and time the depth image is being captured. An RGB-D camera can capture the stream of color images and the stream of depth images simultaneously at different frame rates, or in some embodiments, at the same frame rate.

The 3-D object recognition system 704 can process the stream of images of the scene 702 and can generate data specifying one or more 3-D bounding boxes of the one or more objects in the scene 702. The 3-D object recognition system 704 belongs to the passable world component 202 that creates and maintains a passable world model. The generated output data specifying recognized objects in the scene can be used to create and update the passable world model.

In some implementations, the one or more AR devices can send the stream of images to the cloud computing environment 234. In some implementations, the one or more AR devices can perform preprocessing on the AR devices before sending the processed images to the cloud computing environment 234.

The 3-D object recognition system can perform scalable 3-D object recognition with a cloud computing environment 234. The 3-D object recognition system can use a 3-D object recognition algorithm that can be divided into multiple subsystems. The subsystems can be implemented in multiple independent stateless modules. The stateless modules can be started, restarted, scaled up or scaled down as needed. For example, when the system is processing streams of large amounts of input images captured from multiple AR devices, the system can scale up the stateless modules such that the input image frames can be processed in parallel.

In some implementations, the 3-D object recognition system can start multiple modules that can perform 3-D object recognition of the multiple objects in the scene 702. The multiple modules can run in parallel and be independent from each other. The passable world model can be updated based on the 3-D object recognition output of each module and does not need to wait for the 3-D object recognition outputs of all the objects in the entire scene.

For example, the system can have a first module to generate a 3-D bounding box for the single couch, and the system can have a second module to generate a 3-D bounding box for the coffee table. The first module and the second module can process different objects, i.e., the single couch and the coffee table. Therefore, the first module and the second module can be scaled independently as needed to compute 3-D bounding boxes of the single couch and the coffee table. More details of the subsystems of the 3-D object recognition system are described in connection with FIG. 4.

The generated 3-D bounding boxes of the objects are overlaid with the scene as shown in a top view 706. Each 3-D bounding box of an object is an estimated rectangular box that tightly surrounds the object. For example, the rectangular box 708 is a top view of the 3-D bounding box of the coffee table. A 3-D bounding box can be specified by the coordinate of a corner or other reference location of the box, a width, a height, and a depth of the box. In some implementations, the 3-D bounding box can be specified using a set of reference coordinates relative to a fixed point on the surface of the bounding box, i.e., a different coordinate than the corner of the box, for example, an anchor point.

Figure 4:
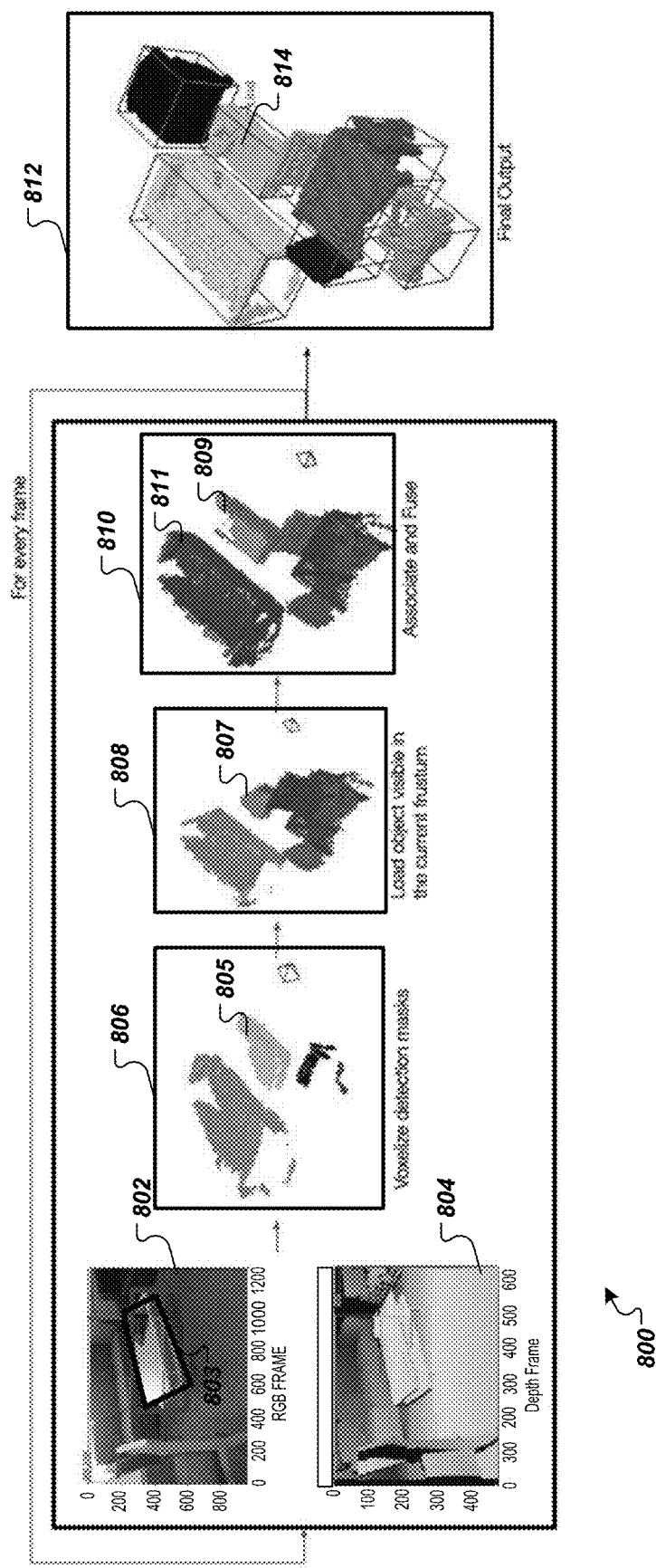
FIG. 4 illustrates an example 3-D object recognition system that generates 3-D bounding boxes for objects in a scene from a stream of color images and a stream of depth images.

FIG. 4 illustrates an example 3-D object recognition system 800 that generates 3-D bounding boxes for objects in a scene from a stream of color images and a stream of depth images. The system 800 can be one example of the object recognizers 224 that run in a cloud environment. The system 800 receives a stream of input images of the scene. The stream of input images includes a stream of color images 802 and a stream of depth images 804. The color images 802 and depth images 804 can be in asynchronous streams at different frame rates. For example, the stream of color images 802 can be at 5 frames per second, and the stream of depth images 802 can be at 1 frame per second. The stream of color images 802 and the stream of depth images 804 can be in different image resolutions. For example, the stream of color images can have much higher resolution than the stream of depth images.

The system takes as input each of a plurality of color images in the stream of color images. The system may process each color image in the stream of color images. Alternatively, the system may process a subset of color images selected at a certain time interval from the stream of color images. That is, the system may not process every color image in the stream of color images. The stream of depth images can be temporarily stored in a storage system while the system processes the color images.

Each input color image captures a scene of an environment from a camera pose. For example, the input color image 802 captures a partial view of the scene 702 from the camera pose 710, and the visible objects include one dining chair, the long couch, the single sofa, and the coffee table in the scene 702.

Each input color image 802 is processed through an object recognition system. The object recognition system can generate a 2-D object recognition output from an input color image. The 2-D object recognition output can include data that identifies a respective object mask in the color image for each of one or more objects that have been recognized in the color image. The object mask can include values of a plurality of pixels that can indicate whether a pixel belongs to an object or not, i.e. a foreground pixel or a background pixel. For example, a contour 803 of a segmentation mask of the coffee table is overlaid on top of the input color image 802. The region inside the contour 803 indicates pixels that belong to the coffee table object.

The 2-D object recognition system can implement one or more computer vision algorithms that perform 2-D object recognition. The one or more computer vision algorithms can include a machine learning based algorithm, e.g., one that uses a machine learning model that has been previously trained with training data that includes 2-D object mask labels.

Various 2-D object recognition algorithms can be used, such as Mask Region-Convolutional Neural Network (R-CNN) (He, Kaiming, et al. "Mask R-CNN." Proceedings of the IEEE international conference on computer vision. 2017), a Single Shot Detector (SSD) (Wei Liu, Dragomir Anguelov, Dumitru Erhan, Christian Szegedy, Scott Reed, Cheng-Yang Fu, and Alexander C. Berg. SSD: Single shot multi-box detector. 2016.), and a YOLO Detector (J. Redmon, S. Divvala, R. Girshick, and A. Farhadi. You only look once: Unified, real-time object detection. In 2016 IEEE Conference on Computer Vision and Pattern Recognition (CVPR), pages 779-788, June 2016.), etc.

For example, the 2-D object recognition system can use a Mask R-CNN neural network trained on an object detection dataset which detects indoor objects of interest, e.g., chair, table, sofa, TV, etc. Mask R-CNN can generate a binary mask for each of a predetermined number of objects. Each binary object mask can separate the foreground object from the background.

In some implementations, if no object has been recognized in the input color image, the system can proceed to process the next input color image in the plurality of color images in the stream of color images.

In some implementations, if one or more objects have been recognized in the input color image, the system can proceed to synchronize the input color image with the depth images based on timestamps. The system may only perform synchronization for color images in which at least one object of interest has been detected. In this way, the system can reduce the amount of computation needed because many of the input color images may not have an object of interest.

The input color image and a plurality of depth images in the stream of depth images are provided as input to a synchronization system. The synchronization system can determine a corresponding depth image 804 for the color image 802 based on a timestamp of the corresponding depth image and a timestamp of the color image. In some implementations, among the plurality of depth images, the synchronization system can identify a depth image which has the closest timestamp to the input color image 802. If the timestamp difference is less than some threshold, the identified depth image is accepted as a corresponding depth image 804 to the input color image 802. In some implementations, the input color image and the depth image can be captured from different cameras of multiple AR devices. For example, if multiple AR devices are capturing depth images of the living room, based on the timestamp information and camera poses, the system may identify a depth image captured by a first AR device as a corresponding depth image to an input color image that is captured by a second AR device.

The data identifying the object masks and the corresponding depth image 804 are provided as input to a 3-D bounding box generation system. The 3-D bounding box generation system can determine, from the object masks and the corresponding depth image, a respective 3-D bounding box for each of the one or more objects that have been recognized in the input color image 802.

In some implementations, for each 2-D image coordinate with a valid depth value, the system can project the 2-D image coordinate into a 3-D voxel coordinate by projecting the color image to the depth image. Given the predicted binary 2-D object mask for an object recognized in the color image, the system can generate corresponding 3-D voxels in a 3-D object mask.

In some implementations, the depth image can have lower image resolution than the color image. For example, the resolution of a depth image can be 200×400, while a corresponding color image can be 800×1600. The 3-D voxels that are projected from the 2-D object mask in the color image can have a lower resolution corresponding to the depth image resolution. This can save computational cost in subsequent processing steps.

For example, from the depth image 804 and the 2-D object mask 803 of the coffee table, the 3-D bounding box generation system can determine depth value for each pixel in the object mask. The system can generate a 3-D object mask represented by voxels 805, and each voxel can be calculated from the pixel location in the input color image and the corresponding depth value in the corresponding depth image. The 3-D bounding box generation system can determine a 3-D bounding box of the coffee table based on the 3-D object mask 805.

For example, the system can calculate voxel representation 805 from the locations of the foreground pixels in the segmentation mask 803. For each foreground pixel with 2-D image coordinate (x, y), the system can project the image coordinate into a world coordinate frame using the corresponding depth value and the camera pose of the depth image. The world coordinate frame can be previously determined and can be the same as the camera pose of the depth image. Given a voxel resolution r (e.g., r=4 cm) that is determined based on a resolution of the depth image, each point in the world coordinate frame is discretized to a corresponding voxel. Based on these conversions, given a 2-D binary object mask 803 for an object in the input color image, the system can project all foreground pixels of the binary mask to the corresponding 3-D voxels 805 in the world coordinate frame.

In some implementations, the system can maintain object data specifying objects that have been previously recognized in the scene in the environment. The object data can include 3-D bounding boxes of one or more objects that have been previously recognized in multiple views of the scene of the environment. The system can store the object data of previously recognized objects in a storage system 230 or 228.

In some implementations, the 3-D bounding box generation system can retrieve object data specifying objects that have been previously recognized, and update the object data specifying previously recognized objects that are near the one or more objects that have been currently recognized in the input color image.

The 3-D bounding box generation system can include a multi-view fusion system. The multi-view fusion system can obtain maintained object data of previously recognized objects that are visible 808 in the camera pose of the input image. The multi-view fusion system can associate currently recognized objects in the current input image with the previously recognized objects. The multi-view fusion system can perform fusion 810 between the generated 3-D object masks of the currently recognized objects and the maintained object data specifying previously recognized objects that are associated with the currently recognized objects.

For example, the multi-view fusion system can estimate the objects that are visible 808 in the current input image by computing the intersection of a currently recognized 3-D object mask with a previously recognized 3-D object mask for a corresponding object in the neighborhood of the current input image. The neighborhood size can be a predetermined value, e.g., 5 meter radius of the current input image. In some implementations, all the previously recognized objects with non-zero intersection with the currently recognized 3-D object masks can be identified as objects that are visible. For example, the system can determine that a previously recognized 3-D object mask 807 of a coffee table is visible in the current camera pose.

For example, after loading previously recognized objects 808 that are visible in the current camera pose, the multi-view fusion system can perform object association and fusion. For each 3-D object mask in 806 recognized in the current input color image 802, the system can determine whether there exists an object mask of a previously recognized object based on a relative distance of the two masks. For example, the system can determine that a 3-D object mask 807 is associated with the 3-D object mask 805 of the recognized coffee table. The system can generate an updated 3-D object mask 809 by calculating a union of the two object masks. In this example, by calculating a union of the two object masks, the system can perform fusion of the two object masks.

After processing each image of the plurality of images in the stream of color images, the system can generate a final output 812 that includes data specifying the one or more 3-D bounding boxes of the one or more recognized objects in the scene. For example, the system can output a 3-D bounding box 814 for the coffee table in the living room.

The 3-D object detection system can run 3-D object recognition on every input color image, e.g., each frame, independently. The system can process every input color image on a different stateless module in parallel. In some implementations, the system can use an object level locking/unlocking method to ensure that the same object is not updated at the same time by different modules.

For example, after the system determines there exists a previously recognized coffee table 807 in the current camera pose, the system can lock information of the previously recognized coffee table stored in the storage system while performing the object association and fusion 810 with the 3-D object mask recognized in the current input image. This can ensure that the coffee table is not updated by other modules that run in parallel.

The one or more 3-D bounding boxes 812 can be provided to the passable world component 202 that creates and maintains a model of a passable world. The passable world component can directly use the one or more 3-D bounding boxes in the passable world model. Alternatively or in combination, the passable world component can further process the one or more 3-D bounding boxes in order to generate a new or an updated passable world model.

Figure 5:
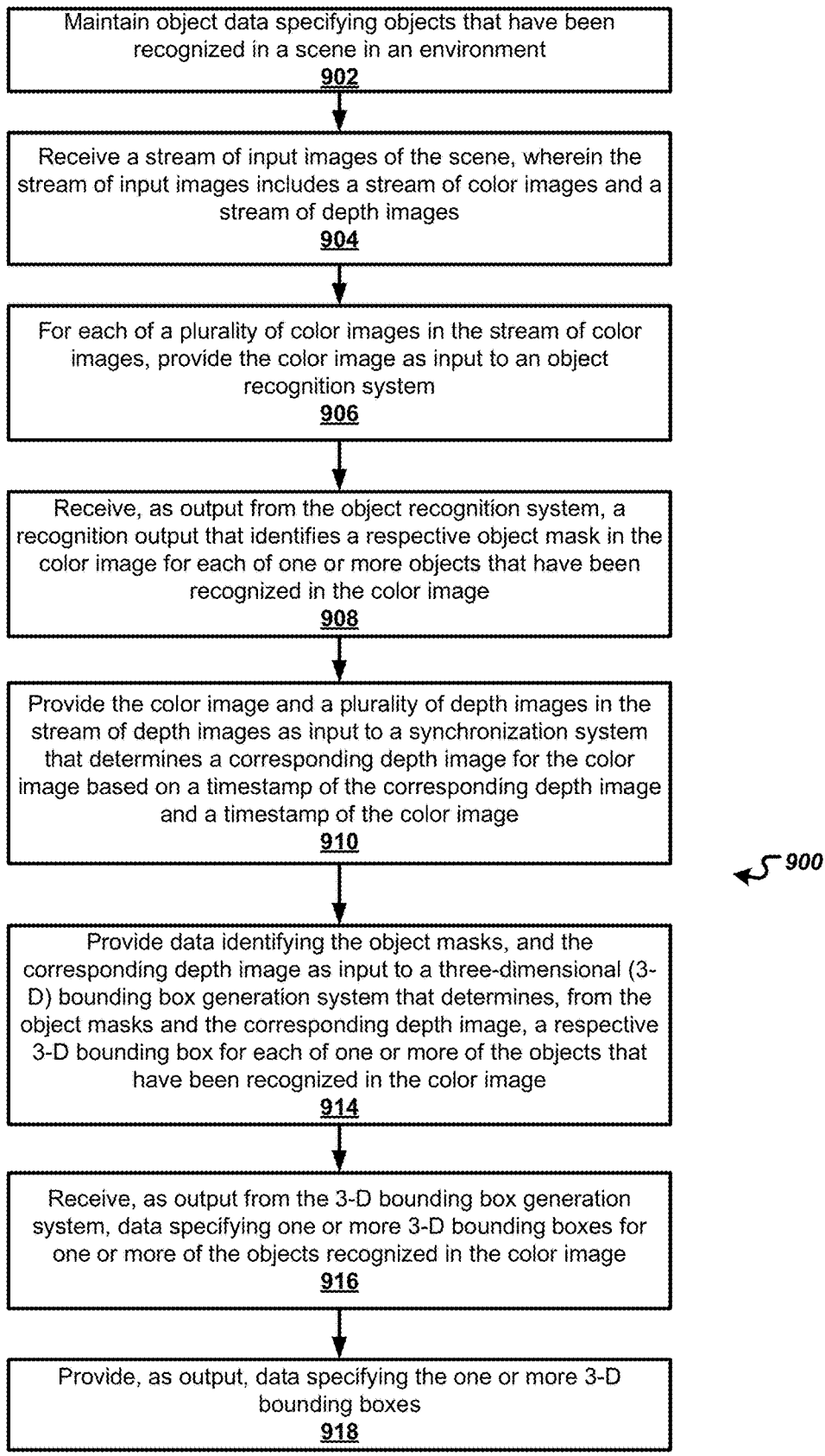
FIG. 5 is a flow chart of an example process for computing 3-D object recognition results from a stream of input images of a scene.

FIG. 5 is a flow chart of an example process 900 for computing 3-D object recognition results from a stream of input images of a scene. The process will be described as being performed by an appropriately programmed AR system 200. The process 900 can be performed in a cloud computing environment 234. In some implementations, some computation in the process 900 can be done in the local AR device in the passable world component 202, while the local AR device is connected to the cloud.

The system maintains object data specifying objects that have been recognized in a scene in an environment (902). The scene can either include a small region or a large area, e.g., a room, a floor of a building, or as large as a city, etc. The objects in the scene can include 3-D real world objects. The objects can be stationary objects or moving objects. The object data specifying objects that have been recognized can include previously calculated 3-D bounding boxes or 3-D object masks of the objects in the scene. The system can maintain object data by storing the object data in a storage system that can be either on an AR device or in the cloud, or both. The object data maintained by the system can be updated using images of the scene of the environment that are collected by one or more AR devices.

The system receives a stream of input images of the scene (904). The stream of input images can include a stream of color images and a stream of depth images. The stream of input images can be from one or more AR devices that capture the scene from one or more camera poses. In some implementations, an AR device can capture a stream of input images while a user of the AR device travels in the scene. The steam of input images can include corresponding camera pose information. The camera pose can include six degrees of freedom (6DOF), including freedom to change the camera pose forward and backward, up and down, left and right relative to a coordinate system of the surrounding environment.

In some implementations, the one or more AR devices that share the environment are connected to a cloud computing environment 234. The one or more AR devices can send the collected camera images to the cloud. The system can recognize one or more objects using the stream of images in the cloud.

For each of a plurality of color images in the stream of color images, the system provides the color image as an input to an object recognition system (906). For example, the system can pass each color image to a 2-D segmentation module which can perform object segmentation for an object of interest. The 2-D segmentation module can generate segmentation masks for a chair, a table, a sofa, a poster, a TV screen, etc.

The system can provide input images that capture various views of the same object to the object recognition system. The object recognition system can generate 2-D segmentation masks of the same object from various views. For example, the system 2-D segmentation module can generate four segmentation masks for a chair from a left side view, a right side view, a front view and a back view of the same chair. Having segmentation masks from different views, the system can later generate a more complete 3-D object recognition output of the object of interest.

The system receives, as an output from the object recognition system, a recognition output that identifies a respective object mask in the color image for each of one or more objects that have been recognized in the color image (908). In some implementations, the object recognition system can include a trained deep neural network (DNN) model. The DNN model can take the color image as an input and can generate a respective 2-D object mask for each of the one or more objects that have been recognized in the color image. Each object mask can characterize a size and a shape of an object from the corresponding camera pose of the input color image.

The system provides the color image and a plurality of depth images in the stream of depth images as an input to a synchronization system (910). The synchronization system can determine a corresponding depth image for the color image based on a timestamp of the corresponding depth image and a timestamp of the color image. Each depth image or color image has a timestamp that describes a date and time that image is being captured. The timestamp information of the depth images and the color images can indicate a time relationship between the stream of depth images and the stream of color images.

In some implementations, the synchronization system can identify a candidate depth image which has a closest timestamp to the timestamp of the color image. The synchronization system can determine that a time difference between the candidate depth image and the color image is less than a threshold, e.g., 1 second. In response, the synchronization system can determine the candidate depth image as the corresponding depth image for the color image. If the system cannot identify a corresponding depth image for the color image, the system can stop processing the color image and start processing the next color image in the stream of color images.

The system provides data identifying the object masks, and the corresponding depth image as an input to a 3-D bounding box generation system (914). The 3-D bounding box generation system determines, from the object masks and the corresponding depth image, a respective 3-D bounding box for each of one or more of the objects that have been recognized in the color image.

Figure 6:
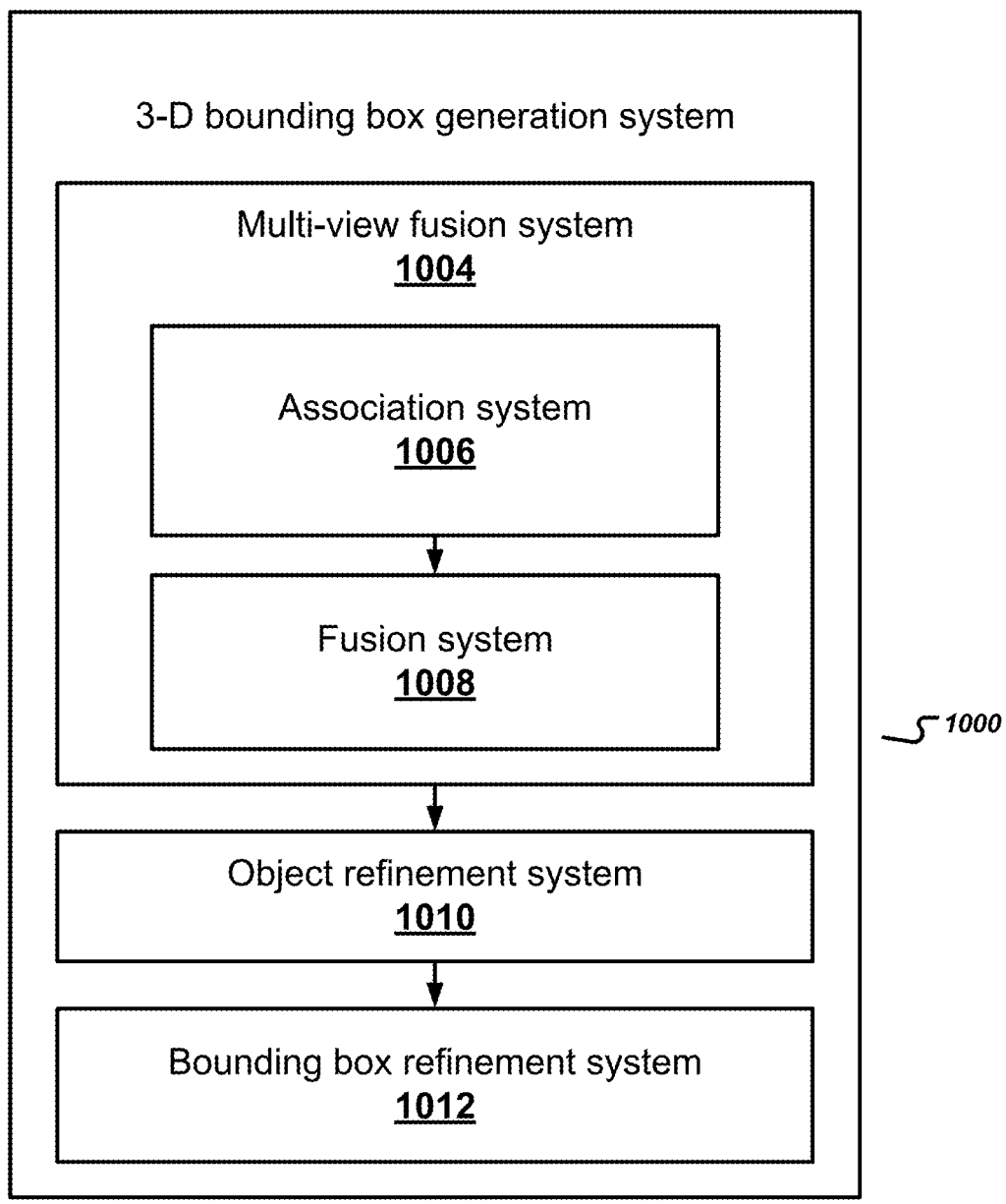
FIG. 6 a system diagram that illustrates several subsystems in an example 3-D bounding box generation system.

In some implementations, the 3-D bounding box generation system can include a plurality of subsystems. FIG. 6 is a system diagram that illustrates several subsystems in an example 3-D bounding box generation system 1000. The 3-D bounding box generation system 1000 can include a multi-view fusion system 1004, an object refinement system 1010 and a bounding box refinement system 1012. These subsystems can be implemented as stateless modules such that these subsystems can operate in a stateless manner and independently from one another. Each stateless module can be independently started, restarted, scaled up or scaled down as needed, without impacting the overall system performance.

The multi-view fusion system can generate an initial set of 3-D object masks. In some implementations, the multi-view fusion system can perform a plurality of steps to generate an initial set of 3-D object masks. The system can determine that the generated object mask corresponds to one or more valid depth values in the depth image. In response to determining that the generated object mask corresponds to one or more valid depth values in the depth image, the system can find nearby objects that have been recognized in the color image within a predefined distance from the depth camera's center. Based on the depth values of corresponding pixels in the depth image, the system can generate 3-D voxel representation of each object mask for each nearby object. The 3-D voxel representation of each object mask is a 3-D segmentation mask of the 3-D object. Each voxel in the 3-D segmentation mask can represent a 3-D coordinate of a corresponding portion of the object.

As discussed above, the system maintains object data specifying objects that have been recognized in the scene in the environment. The system can find maintained object data of previously recognized objects that are visible in the current camera pose. The maintained object data can include 3-D object masks of the previously recognized object. In some implementations, the maintained object data for each previously recognized object can include a set of 3-D weighted voxels and a category label. For example, a value of the weight for each voxel can indicate the likelihood that the voxel represents a portion of the previously recognized object. The category label can indicate a class that the object belongs to, such as chair, door, sofa, TV, etc.

In some implementations, the multi-view fusion system can include an association system 1006 and a fusion system 1008.

The association system 1006 can identify, from maintained object data of the previously recognized objects that are visible in the current camera pose, object data specifying a matched previously recognized object with the object mask of currently recognized object in the color image. In some implementations, the association system can associate a 3-D object mask of a recognized object in the color image with a maintained 3-D object mask of a corresponding object that has been previously recognized.

The association system can use a combinatorial optimization algorithm that solves an assignment problem to perform the object association. For example, the system can use the Hungarian method (Munkres, James. "Algorithms for the assignment and transportation problems." Journal of the society for industrial and applied mathematics 5, no. 1 (1957): 32-38) to associate detection in the current input image with the objects that are previously recognized.

The fusion system 1008 can generate, for each recognized object in the color image, an initial 3-D object mask by combining the object mask in the color image with the matched object data. In some implementations, if an association between the 3-D object mask of the recognized object in the color and a 3-D object mask of a previously recognized object is found, the system can update the 3-D object mask through mask fusion. For example, the fusion system can increase the values of the weights of the overlapping voxels between the two 3-D object masks, indicating that the likelihood that these voxels represent portions of the object has increased. The fusion system can also add new voxels to an updated 3-D object mask, and these new voxels correspond to non-overlapping voxels between the two 3-D object masks.

In some implementations, the system can determine that a recognized object in the color image does not have an associated existing object among the maintained object data of the previously recognized objects that are visible in the current camera pose, the system can create a new object instance with the 3-D object mask, and the system can add the new object instance to the maintained object data.

The multi-view fusion system 1004 can associate and fuse a plurality of 3-D object masks from a stream of input images. The multi-view fusion system can generate object masks at an object level. Each object mask can be updated independently and multiple objects can be updated concurrently and asynchronously.

For example, the system can concurrently update the object mask 811 of the long couch and the object mask 809 of the coffee table. The system can have one multi-view fusion system to work on the association and fusion of the object masks of the long couch, and the system can asynchronously have another multi-view fusion system to work on the association and fusion of the object masks of the coffee table. The two systems can run concurrently and in parallel. Therefore, the system can process lots of images and lots of objects efficiently.

The object refinement system 1010 can refine the initial set of 3-D object masks to generate an initial set of 3-D bounding boxes. For every new or updated object generated by the multi-view fusion system, the system can find nearby objects that are in the neighborhood of the new or updated object. The object refinement system can perform a plurality of object refinement operations according to a plurality of criterions.

For example, the system can remove noisy voxels from the initial set of 3-D object masks using a 3-D connected component algorithm (Samet, H.; Tamminen, M. (1988). "Efficient Component Labeling of Images of Arbitrary Dimension Represented by Linear Bintrees". IEEE Transactions on Pattern Analysis and Machine Intelligence. 10 (4): 579.). The system can remove voxels or objects not seen from a sufficient number of views. The system can merge nearby objects if they belong to categories that are related, such as a desk and a table.

After object refinement operations, the system can convert the refined 3-D object masks to an initial set of 3-D bounding boxes. The system can generate 3-D cuboid bounding boxes that are oriented at a chosen camera pose. The camera pose can be the same as the camera pose of one of the input color images, or the camera pose can be predetermined by the passable world component 202.

The bounding box refinement system 1012 can refine the initial set of 3-D bounding boxes to generate one or more final 3-D bounding boxes 812. For every new or updated bounding box generated by the object refinement system, the bounding box refinement system 1012 can remove noisy bounding boxes. The bounding box refinement system can perform a plurality of bounding box refinement operations based on a plurality of criterions.

For example, the system can remove overlapping bounding boxes that belong to the same category through algorithms such as a Non-Maximum Suppression algorithm (Neubeck, Alexander, and Luc Van Gool. "Efficient non-maximum suppression." 18th International Conference on Pattern Recognition (ICPR'06). Vol. 3. IEEE, 2006). As another example, the system can remove bounding boxes that do not satisfy a size constraint for a given category label. For example, the system can remove a bounding box labeled as a couch that is less than 30 centimeters long.

In some implementations, the object recognition system, the synchronization system, the multi-view fusion system, e.g., the association system and the fusion system, the object refinement system and the bounding box refinement system can operate in a stateless manner and independently from one another. By dividing the object recognition task into multiple subsystems, the 3-D object recognition system can implement each subsystem in an independent stateless module. Each stateless module can be independently started, restarted, scaled up or scaled down as needed, without impacting the overall system performance.

For example, if multiple users of multiple AR devices are looking at the same object, the number of frames per second of the input images being received at the cloud is higher than the number of outputs per second generated by the 2-D object recognition system because each stateless module of the 2-D object recognition system may take 1 second to perform 2-D object detection and segmentation. The system can scale up the stateless module that performs 2-D object recognition to make sure the throughput of this module is high enough and it is not blocking a subsequence processing module.

The 3-D object recognition system is scalable in the number of AR devices (or AR device users), and the number of objects in the scene of the environment. Multiple AR devices can be connected to a cloud computing environment and can jointly contribute multiple streams of input data for 3-D object recognition and can share the recognized 3-D objects.

The system receives, as an output from the 3-D bounding box generation system, data specifying one or more 3-D bounding boxes for one or more of the objects recognized in the color image (916). In some implementations, the system also stores data specifying one or more 3-D bounding boxes as intermediate 3-D bounding boxes in a storage system.

The system provides, as an output, data specifying the one or more 3-D bounding boxes (918). The system can store the one or more 3-D bounding boxes as updated 3-D bounding boxes in the storage system 230 in the cloud. The system can also store a copy of the most recent 3-D bounding boxes in the storage system 228 on the AR device. The system can provide the output to the passable world component 202 of the AR system. The passable world component 202 can use the one or more 3-D bounding boxes of the one or more recognized objects to create or to update a passable world model that is shared across multiple AR devices. For example, the one or more 3-D bounding boxes can be used to create or update persistent coordinate frames (PCFs) in the passable world model.

In some implementations, the 3-D bounding box generation system can determine, from the object masks and the corresponding depth image, a respective 3-D object mask for each of the one or more objects that have been recognized in the color image. The system can receive, as an output from the 3-D bounding box generation system, data specifying one or more 3-D object masks for the one or more of the objects recognized in the color image. The system can provide, as an output, data specifying the one or more 3-D object masks. The passable world model can include information of the one or more 3-D object masks. In some implementations, the system can output 3-D mesh data that identifies 3-D object masks of objects that have been recognized.

AR applications can have more immersive experiences using the passable world model that is based on 3-D object masks. For example, a virtual assistant of an interactive game application can sit on a chair that has been recognized in the passable world model. Using the 3-D mesh data of the chair, the virtual assistant can sit on the seat of the chair, rather than on the top of a 3-D bounding box of the chair, providing more immersive experience.

Figure 7:
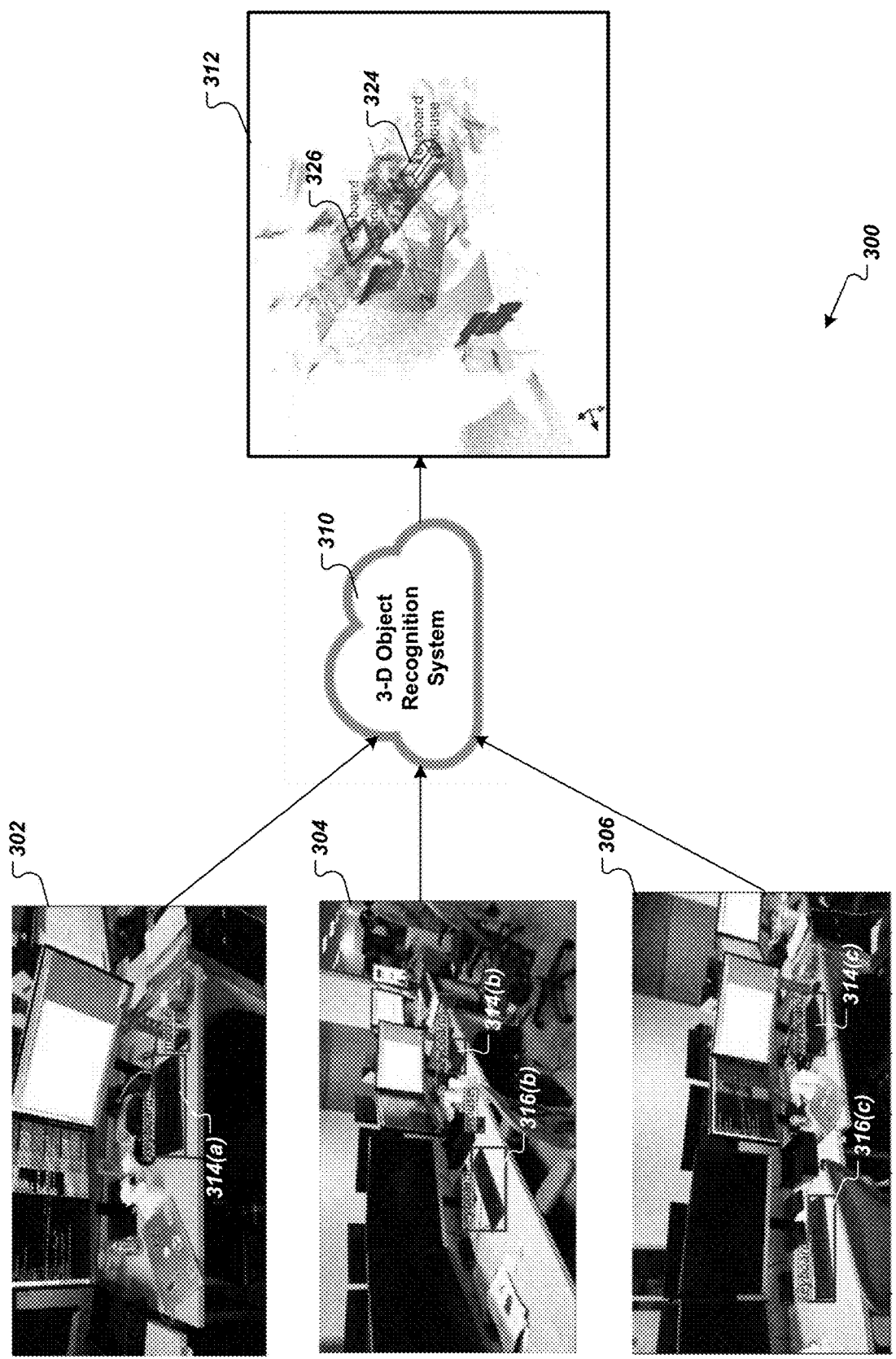
FIG. 7 shows an example 3-D object recognition system that generates 3-D bounding boxes for objects in a scene from a stream of input images.

FIG. 7 shows an example 3-D object recognition system 300 that generates 3-D bounding boxes for objects in a scene from a stream of input images. The system 300 can be one example of the object recognizers 224 that run in the cloud environment. The stream of input images of the scene can be captured using one or more cameras. In some implementations, multiple cameras (e.g. RGB cameras) from multiple AR devices can generate images of the scene from various camera poses. For example, a stream of color images 302, 304 and 306 can depict a scene of an office environment. The office environment can have several 3-D objects, including monitors, desks, chairs, keyboards, and mouses, etc. The same keyboard 314 can be captured as 314(*a*), 314(*b*) and 314(*c*) from three camera poses corresponding to input images 302, 304 and 306. As each camera moves in the environment (e.g., the office environment), each camera can capture a stream of images at a series of camera poses.

In some embodiments, the stream of images of the scene can include a stream of color images. The stream of color images can include frames of two-dimensional (2-D) images or videos captured by a camera. The stream of color images can be at a certain frame rate. For example, the stream of color images can be at 5 frames per second. Each 2-D image can be an RGB image depicting colors of one or more objects and colors of their surrounding environment in the physical world. Each color image is associated with data identifying a camera pose when the color image is captured. The camera pose can include six degrees of freedom (6DOF), including freedom to change the camera pose forward and backward, up and down, left and right relative to a coordinate system of the surrounding environment.

Some 3-D objects can be either dark, e.g., black, or reflective. It can be challenging to capture depth images of these 3-D objects that are black or reflective using a depth camera. In other words, the depth information of these 3-D objects can have poor quality and may not be beneficial in performing 3-D object recognition. For example, a keyboard or a mouse can be in black color, and the depth sensors in an RGB-D camera may not work well enough to capture the depth information of the keyboard or the mouse.

The stream of images of the scene captured by a plurality of camera poses can provide abundant 3-D information of the 3-D objects in the scene, even when depth information is not available. The stream of images of the scene can be used to generate object recognition outputs of 3-D objects (e.g., a keyboard) although the depth information may not be completely available.

The 3-D object recognition system 310 can process the stream of images of the scene and can generate data 312 specifying one or more 3-D bounding boxes of the one or more objects in the scene. For example, from a stream of input images 302, 304, and 306, the 3-D object recognition system 310 can recognize 2-D bounding boxes of the same keyboard in each image, e.g., keyboard 314(a), 314(b) and 314(c). Based on the 2-D bounding boxes, the 3-D object recognition system 310 can generate a 3-D bounding box 324 of the keyboard.

Each 3-D bounding box of an object is an estimated rectangular box that tightly surrounds the 3-D object. For example, the rectangular box 324 is a 3-D bounding box of the keyboard 314(a) (314(b) or 314(c)).

The 3-D object recognition system 310 belongs to the passable world component 202 that creates and maintains a passable world model. The generated output data 312 specifying recognized objects in the scene can be used to create and update the passable world model.

In some implementations, the one or more AR devices can send the stream of images to the cloud computing environment 234. In some implementations, the one or more AR devices can perform preprocessing on the AR devices before sending the processed images to the cloud computing environment 234.

The 3-D object recognition system can perform scalable 3-D object recognition with a cloud computing environment 234. The 3-D object recognition system can use a 3-D object recognition algorithm that can be divided into multiple subsystems. The subsystems can be implemented in multiple independent stateless modules. The stateless modules can be started, restarted, scaled up or scaled down as needed. For example, when the system is processing streams of large amounts of input images captured from multiple AR devices, the system can scale up the stateless modules such that the input image frames can be processed in parallel.

In some implementations, the 3-D object recognition system can start multiple modules that can perform 3-D object recognition of the multiple objects in the scene. The multiple modules can run in parallel and be independent from each other. The passable world model can be updated based on the 3-D object recognition output of each module and does not need to wait for the 3-D object recognition outputs of all the objects in the entire scene.

For example, the system can have a first module to generate a 3-D bounding box for the first keyboard 314 using keyboard images 314(a), 314(b) and 314(c), and the system can have a second module to generate a 3-D bounding box for the second keyboard 316 using keyboard images 316(b) and 316(c). The first module and the second module can process data for different objects, i.e., the first keyboard and the second keyboard. Therefore, the first module and the second module can be scaled independently as needed to compute a 3-D bounding box 324 of the first keyboard and a 3-D bounding box 326 of the second keyboard. More details of the subsystems of the 3-D object recognition system are described in connection with FIG. 8.

Figure 8:
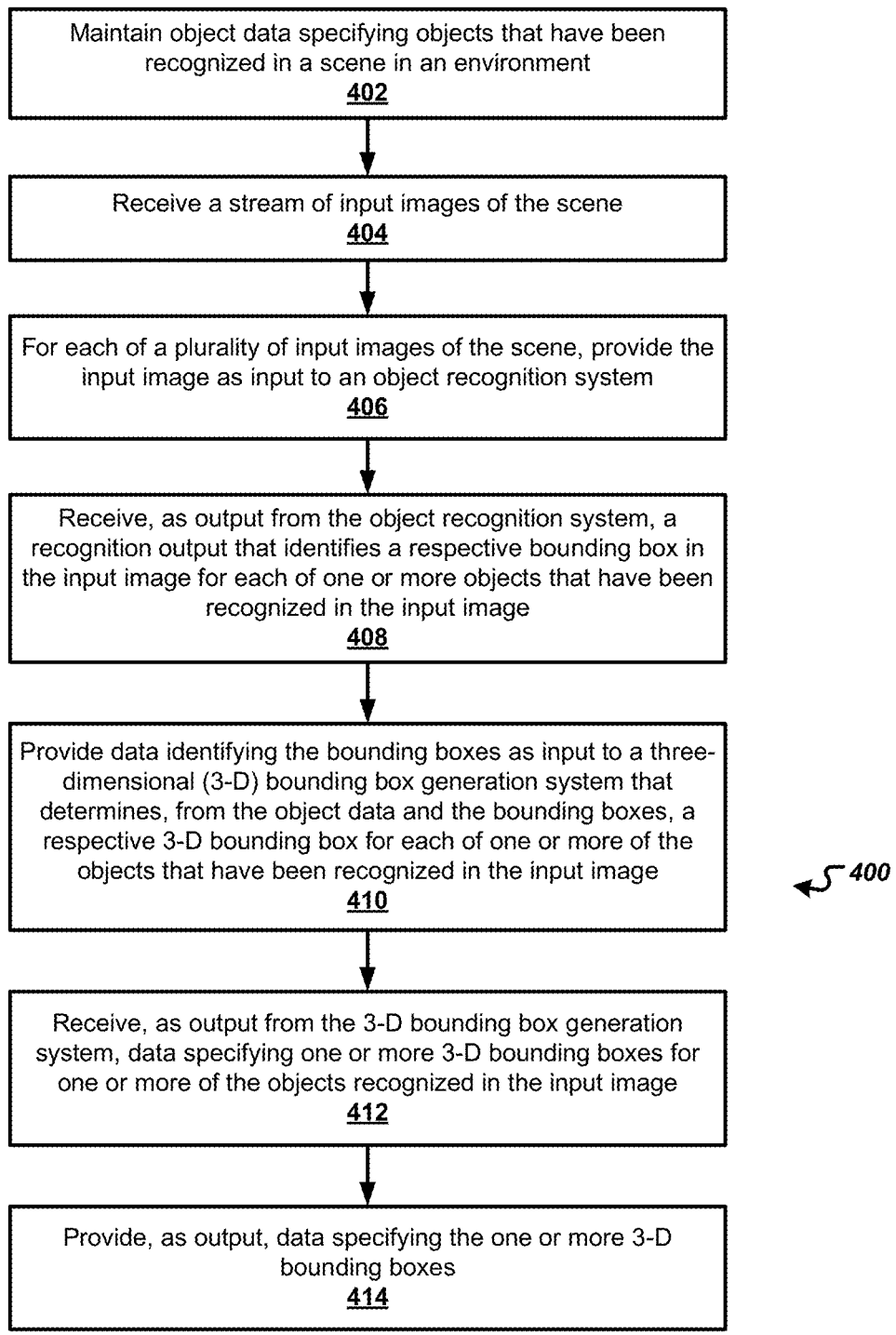
FIG. 8 is a flow chart of an example process for computing 3-D object recognition results from a stream of input images of a scene.

FIG. 8 is a flow chart of an example process 400 for computing 3-D object recognition results from a stream of input images of a scene. The process will be described as being performed by an appropriately programmed AR system 200. The process 400 can be performed in a cloud computing environment 234. In some implementations, some computation in the process 400 can be done in the local AR device in the passable world component 202, while the local AR device is connected to the cloud.

The system maintains object data specifying objects that have been recognized in a scene in an environment (402). The scene can either include a small region or a large area, e.g., a room, a floor of a building, or as large as a city, etc. The objects in the scene can include 3-D real world objects. The objects can be stationary objects or moving objects. The object data specifying objects that have been recognized can include previously calculated 3-D bounding boxes or 3-D object masks of the objects in the scene. The system can maintain object data by storing the object data in a storage system that can be either on an AR device or in the cloud, or both. The object data maintained by the system can be updated using images of the scene of the environment that are collected by one or more AR devices. The system can store the object data of previously recognized objects in a storage system 230 or 228.

The system receives a stream of input images of the scene (404). The stream of input images can include a stream of color images. The stream of input images can be from one or more AR devices that capture the scene from one or more camera poses. In some implementations, an AR device can capture a stream of input images while a user of the AR device travels in the scene. The steam of input images can include corresponding camera pose information. The camera pose can include six degrees of freedom (6DOF), including freedom to change the camera pose forward and backward, up and down, left and right.

The system may process each input image in the stream of input images. Alternatively, the system may process a subset of input images selected at a certain time interval from the stream of input images. That is, the system may not process every input image in the stream of input images. The stream of input images can be temporarily stored in a storage system while the system processes some of input images.

In some implementations, the one or more AR devices that share the environment are connected to a cloud computing environment 234. The one or more AR devices can send the collected camera images to the cloud. The system can recognize one or more objects using the stream of images in the cloud.

For each of a plurality of input images of the scene, the system provides the input image as an input to an object recognition system (406). For example, the system can pass each color image to an object recognition system, e.g., a 2-D object detection module which can perform object detection for an object of interest, such as a keyboard or a mouse.

The system can provide input images that capture various views of the same object to the object recognition system. The object recognition system can generate 2-D bounding boxes of the same object from various views. For example, the 2-D object detection module can generate three 2-D bounding boxes for a keyboard from a left side view, a right side view and a front view of the same keyboard. Having 2-D bounding boxes from different views, the system can later generate a 3-D object recognition output of the object of interest.

The object recognition system, e.g., a 2-D object recognition system can implement one or more computer vision algorithms that perform 2-D object recognition. The one or more computer vision algorithms can include a machine learning based algorithm, e.g., one that uses a machine learning model that has been previously trained with training data that includes 2-D object bounding box labels. In some implementations, the object recognition system can include a trained deep neural network (DNN) model.

Various 2-D object recognition algorithms can be used, such as Faster Region-Convolutional Neural Network (R-CNN) (Ren, Shaoqing, Kaiming He, Ross Girshick, and Jian Sun. "Faster r-cnn: Towards real-time object detection with region proposal networks." In Advances in neural information processing systems, pp. 91-99. 2015), a Single Shot Detector (SSD) (Wei Liu, Dragomir Anguelov, Dumitru Erhan, Christian Szegedy, Scott Reed, Cheng-Yang Fu, and Alexander C. Berg. SSD: Single shot multi-box detector. 2016.), and a YOLO Detector (J. Redmon, S. Divvala, R. Girshick, and A. Farhadi. You only look once: Unified, real-time object detection. In 2016 IEEE Conference on Computer Vision and Pattern Recognition (CVPR), pages 779-788, June 2016.), etc.

For example, the 2-D object recognition system can use a Faster R-CNN neural network model trained on an object detection dataset which detects indoor objects of interest, e.g., chair, table, water bottles, keyboards, books, mouses, etc. Faster R-CNN can generate a bounding box for each of a predetermined number of objects. Each object bounding box can indicate a location of an object that has been recognized in the scene.

The system receives, as an output from the object recognition system, a recognition output that identifies a respective bounding box in the input image for each of one or more objects that have been recognized in the input image (408).

The system provides data identifying the bounding boxes as an input to a 3-D bounding box generation system (410). In some implementations, if no object has been recognized in the input image, the system can proceed to process the next input image in the plurality of input images in the stream of input images. The system may only perform 3-D bounding box generation for input images in which at least one object of interest has been detected. In this way, the system can reduce the amount of computation needed because many of the input images may not have an object of interest.

The 3-D bounding box generation system determines, from the object data and the bounding boxes, a respective 3-D bounding box for each of one or more of the objects that have been recognized in the input image. In some implementations, the 3-D bounding box generation system can include a plurality of subsystems. In some implementations, the 3-D bounding box generation system can include a multi-view fusion system and a bounding box refinement system. The multi-view fusion system can generate an initial set of 3-D bounding boxes. The bounding box refinement system can refine the initial set of 3-D bounding boxes to generate the one or more 3-D bounding boxes.

The multi-view fusion system can generate an initial set of 3-D object bounding boxes. In some implementations, the multi-view fusion system can retrieve object data specifying objects that have been previously recognized, and update the object data specifying previously recognized objects that are near the one or more objects that have been currently recognized in the input image.

In some implementations, the multi-view fusion system can use an ellipsoid fitting algorithm (Rubino C, Crocco M, Del Bue A. 3D Object Localisation from Multi-view Image Detections. IEEE transactions on pattern analysis and machine intelligence. 2017 May 4; 40(6):1281-94) that performs a plurality of steps to generate an initial set of 3-D object bounding boxes. The ellipsoid fitting algorithm can generate an estimation of an ellipsoid in 3-D given a set of 2-D ellipses fitting to the 2-D object detection bounding boxes in multiple views.

With the ellipsoid fitting algorithm, the system can associate each bounding box with nearby existing object bounding boxes. For each 2-D bounding box currently identified in the input image, the system can determine whether each 2-D bounding box currently identified in the input image is associated with one or more 2-D bounding boxes of an object that has been previously recognized in the maintained object data. The system can associate the bounding boxes by comparing the distances between the bounding boxes. For example, the system can determine that a previously recognized 2-D bounding box of the keyboard 314(*a*) is within a neighborhood, e.g., 10 cm range, of a currently recognized 2-D bounding box of the keyboard 314(*b*). The system can then associate the 2-D bounding box of the keyboard 314(*b*) with the 2-D bounding box of the keyboard 314(*a*) in the maintained object data.

If the system determines that the 2-D bounding box currently identified in the input image is associated with the one or more 2-D bounding boxes of the object that has been previously recognized, the system can calculate and update the maintained object data of the previously recognized object. In some implementations, the maintained object data can include an ellipsoid that best fits the one or more previously recognized 2-D bounding boxes. The system can recalculate the ellipsoid that best fits both the 2-D bounding box currently identified in the input image and the one or more previously recognized 2-D bounding boxes. For example, the system can determine that the 2-D bounding box of the keyboard 314(*c*) currently identified in image 306 is associated with the 2-D bounding boxes of the keyboard 314(*a*) and 314(*b*). The system can generate an updated 3-D ellipsoid that best fits the 2-D bounding boxes for the keyboard 314(*a*), 314(*b*) and 314(*c*) detected in three different camera poses.

If the system determines that the 2-D bounding box currently identified in the input image is not associated with the objects that have been previously recognized, the system can create a new object by generating an ellipsoid from at least the 2-D bounding box currently identified in the input image. The system can add the new object to the maintained object data. In some implementations, the system can create a new object by generating an ellipsoid that best fits 2-D bounding boxes generated from a plurality of nearby frames in a RANSAC loop (Fischler M A, Bolles R C. Random sample consensus: a paradigm for model fitting with applications to image analysis and automated cartography. Communications of the ACM. 1981 Jun. 1; 24(6):381-95).

The system can generate the initial set of 3-D bounding boxes using the ellipsoids of the objects that have been recognized in the input image. For example, for each 3-D ellipsoid generated for an object recognized in the input image, the system can generate a tight fitting, gravity aligned 3-D bounding box from the ellipsoid, which can be an initial 3-D bounding box of the object (Rubino C, Crocco M, Del Bue A. 3D Object Localisation from Multi-view Image Detections. IEEE transactions on pattern analysis and machine intelligence. 2017 May 4; 40(6):1281-94). Mesh points of the ellipsoid can be extracted given the ellipsoid matrix by computing the eigenvectors, and eigenvalues of the matrix. The mesh points of the ellipsoid can be projected to the X-Y plane based on the known gravity direction. The tightest fitting 2-D bounding box can be computed in the X-Y plane. The tightest fitting 2-D bounding box can be extended in the Z axis based on the known range of the mesh points in the Z axis, which can result in a tight fitting gravity aligned 3-D bounding box.

In some implementations, the multi-view fusion system can generate 3-D object bounding boxes at an object level. Each object bounding box can be updated independently and multiple objects can be updated concurrently and asynchronously. For example, the system can concurrently update the 3-D object bounding box 324 of the first keyboard 314 and the 3-D object bounding box 326 of the second keyboard 316. The system can have one multi-view fusion system to work on the creation and updates of the object bounding box of the first keyboard, and the system can asynchronously have another multi-view fusion system to work on the creation and updates of the object bounding box of the second keyboard. The two systems can run concurrently and in parallel. Therefore, the system can process a large number of images and data for a large number of objects efficiently.

In some implementations, the system can use an object level locking/unlocking method to ensure that the same object is not updated at the same time by different modules. For example, after the system determines there exists a previously recognized keyboard 314(*a*) from input image 302 in the maintained object data, the system can lock information of the previously recognized keyboard 314 stored in the storage system while performing the multi-view fusion with the 2-D object bounding box of the keyboard 314(*b*) currently recognized in the input image 304. This can ensure that the keyboard 314 is not updated by other modules that run in parallel.

A bounding box refinement system can be a subsystem of the 3-D bounding box generation system. The bounding box refinement system can refine the initial set of 3-D bounding boxes and can generate one or more final 3-D bounding boxes. For every new or updated bounding box generated by the multi-view fusion system, the bounding box refinement system can remove noisy or overlapping bounding boxes. The bounding box refinement system can perform a plurality of bounding box refinement operations based on a plurality of criterions.

For example, the system can remove overlapping bounding boxes that belong to the same category through algorithms such as a Non-Maximum Suppression algorithm (Neubeck, Alexander, and Luc Van Gool. "Efficient non-maximum suppression." 18th International Conference on Pattern Recognition (ICPR'06). Vol. 3. IEEE, 2006). As another example, the system can remove bounding boxes that do not satisfy a size constraint for a given category label. For example, the system can remove a bounding box labeled as a keyboard that is less than 5 centimeters long.

In some implementations, the object recognition system, the multi-view fusion system, and the bounding box refinement system can operate in a stateless manner and independently from one another. By dividing the object recognition task into multiple subsystems, the 3-D object recognition system can implement each subsystem in an independent stateless module. Each stateless module can be independently started, restarted, scaled up or scaled down as needed, without impacting the overall system performance.

For example, if multiple users of multiple AR devices are looking at the same object, the number of frames per second of the input images being received at the cloud is higher than the number of outputs per second generated by the 2-D object recognition system because each stateless module of the 2-D object recognition system may take 1 second to perform 2-D object detection and segmentation. The system can scale up the stateless module that performs 2-D object recognition to make sure the throughput of this module is high enough and it is not blocking a subsequence processing module.

The 3-D object recognition system is scalable in the number of AR devices (or AR device users), and the number of objects in the scene of the environment. Multiple AR devices can be connected to a cloud computing environment and can jointly contribute multiple streams of input data for 3-D object recognition and can share the recognized 3-D objects.

The system receives, as an output from the 3-D bounding box generation system, data specifying one or more 3-D bounding boxes for one or more of the objects recognized in the input image (412). In some implementations, the system also stores data specifying one or more 3-D bounding boxes as intermediate 3-D bounding boxes in a storage system.

The system provides, as an output, data specifying the one or more 3-D bounding boxes (414). The system can store the one or more 3-D bounding boxes as updated 3-D bounding boxes in the storage system 230 in the cloud. The system can also store a copy of the most recent 3-D bounding boxes in the storage system 228 on the AR device. The system can provide the output to the passable world component 202 of the AR system.

The passable world component 202 can use the one or more 3-D bounding boxes of the one or more recognized objects to create or to update a passable world model that is shared across multiple AR devices. For example, the one or more 3-D bounding boxes can be used to create or update persistent coordinate frames (PCFs) in the passable world model. In some implementations, the passable world component can further process the one or more 3-D bounding boxes in order to generate a new or an updated passable world model.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

This specification uses the term "configured" in connection with systems and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
   maintaining object data specifying objects that have been recognized in a scene in an environment;
   receiving a stream of input images of the scene, wherein the stream of input images comprises a stream of color images and a stream of depth images;
   for each of a plurality of color images in the stream of color images:
      providing the color image as input to an object recognition system;
      receiving, as output from the object recognition system, a recognition output that identifies a respective object mask in the color image for each of one or more objects that have been recognized in the color image;
      providing the color image and a plurality of depth images in the stream of depth images as input to a synchronization system that determines a corresponding depth image for the color image based on a timestamp of the corresponding depth image and a timestamp of the color image;
      providing the object data, the recognition output identifying the object masks, and the corresponding depth image as input to a three-dimensional (3-D) bounding box generation system that determines, from the object data, the object masks, and the corresponding depth image, a respective 3-D bounding box for each of one or more of the objects that have been recognized in the color image; and
      receiving, as output from the 3-D bounding box generation system, data specifying one or more 3-D bounding boxes for one or more of the objects recognized in the color image; and
   providing, as output, data specifying the one or more 3-D bounding boxes.

2. The method of claim 1, wherein the 3-D bounding box generation system comprises:
   a multi-view fusion system that generates an initial set of 3-D object masks.

3. The method of claim 2, wherein the object recognition system, the synchronization system, the multi-view fusion system operate in a stateless manner and independently from one another.

4. The method of claim 2, wherein the multi-view fusion system comprises:

an association system that identifies, from the maintained object data, matched object data specifying a corresponding object with the respective object mask of each recognized object in the color image; and a fusion system that generates, for each recognized object in the color image, an initial 3-D object mask by combining the object mask in the color image with the matched object data.

5. The method of claim 2, wherein the 3-D bounding box generation system further comprises an object refinement system that refines the initial set of 3-D object masks to generate an initial set of 3-D bounding boxes.

6. The method of claim 2, wherein the 3-D bounding box generation system further comprises a bounding box refinement system that refines the initial set of 3-D bounding boxes to generate the one or more 3-D bounding boxes.

7. The method of claim 1, wherein the object recognition system comprises a trained deep neural network (DNN) model that takes the color image as input and generates a respective two-dimensional (2-D) object mask for each of the one or more objects that have been recognized in the color image.

8. The method of claim 1, wherein determining, by the synchronization system, a corresponding depth image for the color image based on timestamps of the corresponding depth images and timestamp of the color image comprises:

identifies a candidate depth image which has a closest timestamp to the timestamp of the color image;

determining that a time difference between the candidate depth image and the color image is less than a threshold; and in response, determining the candidate depth image as the corresponding depth image for the color image.

9. The method of claim 1, wherein the 3-D bounding box generation system determines, from the object masks and the corresponding depth image, a respective 3-D object mask for each of the one or more of the objects that have been recognized in the color image, and wherein the method further comprises:

receiving, as output from the 3-D bounding box generation system, data specifying one or more 3-D object masks for the one or more of the objects recognized in the color image; and providing, as output, data specifying the one or more 3-D object masks.

10. A system comprising one or more computers and one or more storage devices storing instructions that when executed by the one or more computers cause the one or more computers to perform operations comprising:

maintaining object data specifying objects that have been recognized in a scene in an environment;

receiving a stream of input images of the scene, wherein the stream of input images comprises a stream of color images and a stream of depth images;

for each of a plurality of color images in the stream of color images:

providing the color image as input to an object recognition system;

receiving, as output from the object recognition system, a recognition output that identifies a respective object mask in the color image for each of one or more objects that have been recognized in the color image;

providing the color image and a plurality of depth images in the stream of depth images as input to a synchronization system that determines a corresponding depth image for the color image based on a timestamp of the corresponding depth image and a timestamp of the color image;

providing the object data, the recognition output identifying the object masks, and the corresponding depth image as input to a three-dimensional (3-D) bounding box generation system that determines, from the object data, the object masks, and the corresponding depth image, a respective 3-D bounding box for each of one or more of the objects that have been recognized in the color image; and receiving, as output from the 3-D bounding box generation system, data specifying one or more 3-D bounding boxes for one or more of the objects recognized in the color image; and providing, as output, data specifying the one or more 3-D bounding boxes.

11. The system of claim 10, wherein the 3-D bounding box generation system comprises a multi-view fusion system that generates an initial set of 3-D object masks, wherein the object recognition system, the synchronization system, the multi-view fusion system operate in a stateless manner and independently from one another.

12. The system of claim 11, wherein the multi-view fusion system comprises:

an association system that identifies, from the maintained object data, matched object data specifying a corresponding object with the respective object mask of each recognized object in the color image; and a fusion system that generates, for each recognized object in the color image, an initial 3-D object mask by combining the object mask in the color image with the matched object data.

13. The system of claim 11, wherein the 3-D bounding box generation system further comprises an object refinement system that refines the initial set of 3-D object masks to generate an initial set of 3-D bounding boxes.

14. The system of claim 11, wherein the 3-D bounding box generation system further comprises a bounding box refinement system that refines the initial set of 3-D bounding boxes to generate the one or more 3-D bounding boxes.

15. The system of claim 10, wherein the object recognition system comprises a trained deep neural network (DNN) model that takes the color image as input and generates a respective two-dimensional (2-D) object mask for each of the one or more objects that have been recognized in the color image.

16. The system of claim 10, wherein determining, by the synchronization system, a corresponding depth image for the color image based on timestamps of the corresponding depth images and timestamp of the color image comprises:

identifies a candidate depth image which has a closest timestamp to the timestamp of the color image;

determining that a time difference between the candidate depth image and the color image is less than a threshold; and in response, determining the candidate depth image as the corresponding depth image for the color image.

17. The system of claim 10, wherein the 3-D bounding box generation system determines, from the object masks and the corresponding depth image, a respective 3-D object mask for each of the one or more of the objects that have been recognized in the color image, and wherein the operations further comprise:

receiving, as output from the 3-D bounding box generation system, data specifying one or more 3-D object masks for the one or more of the objects recognized in the color image; and providing, as output, data specifying the one or more 3-D object masks.

18. A computer program product encoded on one or more non-transitory computer readable media, the computer program product comprising instructions that when executed by one or more computers cause the one or more computers to perform operations comprising:

maintaining object data specifying objects that have been recognized in a scene in an environment;

receiving a stream of input images of the scene, wherein the stream of input images comprises a stream of color images and a stream of depth images;

for each of a plurality of color images in the stream of color images:

providing the color image as input to an object recognition system;

receiving, as output from the object recognition system, a recognition output that identifies a respective object mask in the color image for each of one or more objects that have been recognized in the color image;

providing the color image and a plurality of depth images in the stream of depth images as input to a synchronization system that determines a corresponding depth image for the color image based on a timestamp of the corresponding depth image and a timestamp of the color image;

providing the object data, the recognition output identifying the object masks, and the corresponding depth image as input to a three-dimensional (3-D) bounding box generation system that determines, from the object data, the object masks, and the corresponding depth image, a respective 3-D bounding box for each of one or more of the objects that have been recognized in the color image; and receiving, as output from the 3-D bounding box generation system, data specifying one or more 3-D bounding boxes for one or more of the objects recognized in the color image; and providing, as output, data specifying the one or more 3-D bounding boxes.

19. The non-transitory computer readable media of claim 18, wherein the 3-D bounding box generation system comprises a multi-view fusion system that generates an initial set of 3-D object masks, wherein the object recognition system, the synchronization system, the multi-view fusion system operate in a stateless manner and independently from one another.

20. The non-transitory computer readable media of claim 19, wherein the multi-view fusion system comprises:

an association system that identifies, from the maintained object data, matched object data specifying a corresponding object with the respective object mask of each recognized object in the color image; and a fusion system that generates, for each recognized object in the color image, an initial 3-D object mask by combining the object mask in the color image with the matched object data.

* * * * *